United States Patent
Sakamoto et al.

(10) Patent No.: US 7,211,027 B2
(45) Date of Patent: May 1, 2007

(54) VEHICLE CONTROL APPARATUS OPERABLE DURING SHIFTING OF TRANSMISSION

(75) Inventors: Naoyuki Sakamoto, Okazaki (JP); Yasunari Nakamura, Nagoya (JP); Masayasu Mizobuchi, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 194 days.

(21) Appl. No.: 11/041,230

(22) Filed: Jan. 25, 2005

(65) Prior Publication Data

US 2005/0192154 A1 Sep. 1, 2005

(30) Foreign Application Priority Data

Mar. 1, 2004 (JP) .............................. 2004-056609

(51) Int. Cl.
   B60W 10/06 (2006.01)
   B60W 10/10 (2006.01)
(52) U.S. Cl. .......................................... 477/107; 701/54
(58) Field of Classification Search ................ 477/154, 477/101, 102
   See application file for complete search history.

(56) References Cited

U.S. PATENT DOCUMENTS 4,881,428 A * 11/1989 Ishikawa et al. ............ 477/110
5,772,555 A * 6/1998 Minowa et al. ............. 477/109
5,879,266 A * 3/1999 Sawamura et al. ........... 477/62
2001/0021682 A1* 9/2001 Urasawa ......................... 477/3
2003/0022758 A1* 1/2003 Watanabe et al. ........... 477/118
2003/0233185 A1 12/2003 Takebayashi et al.

FOREIGN PATENT DOCUMENTS

| CN | 1207350 A | 2/1999 |
| CN | 1475684 A | 2/2004 |
| JP | 7-247873 | 9/1995 |

* cited by examiner

Primary Examiner—Sherry Estremsky
Assistant Examiner—Edwin A. Young
(74) Attorney, Agent, or Firm—Oblon, Spivak, McClelland, Maier & Neustadt, P.C.

(57) ABSTRACT

An apparatus for controlling an automotive vehicle including an engine and an automatic transmission. The apparatus is operable upon generation of an engine-output control command requiring an output of the engine during a shift-up action of the transmission initiated in the absence of the engine-output control command, and includes a shifting-progress calculating portion operable to calculate a degree of progress of the shift-up action of the transmission after a moment of generation of the engine-output control command, on the basis of a change of a rotating speed of a rotary element which changes with the progress of the shift-up action, and a gradual-engine-torque-increase control portion operable to control the engine on the basis of the degree of progress of the shift-up action calculated by the shifting-progress calculating portion, so as to gradually increase an output torque of the engine with the progress of the shift-up action.

10 Claims, 12 Drawing Sheets

FIG.2

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

VEHICLE CONTROL APPARATUS OPERABLE DURING SHIFTING OF TRANSMISSION

This application is based on Japanese Patent Application No. 2004-056609 filed on Mar. 1, 2004, the contents of which are incorporated hereinto by reference.

BACKGROUND OF THE INVENTION

1. Field of the Invention

The present invention relates in general to a vehicle control apparatus operable to control an automotive vehicle during a shifting action of an automatic transmission of the vehicle, and more particularly to a vehicle control apparatus which is operable, upon generation of an engine-output command requiring an engine of the vehicle to provide a desired output during a shift-up action of the automatic transmission initiated in the absence of the engine-output command, to efficiently establish an output torque or drive torque of the engine according to the engine-output command, while preventing or minimizing a racing phenomenon of the engine, an excessive increase of a thermal load of frictional coupling devices of the automatic transmission, or an excessive shifting shock of the automatic transmission.

2. Discussion of Related Art

In the field of an automotive vehicle, there is widely used an automatic transmission of a type arranged to transmit an output of an engine to drive wheels of the vehicle, at a selected one of a plurality of speed ratios by establishing a corresponding one of operating positions of the automatic transmission, by selecting a corresponding one of different combinations of operating states (engaged and released states) of a plurality of frictional coupling devices incorporated in the automatic transmission. JP-A-7-247873 discloses an example of a control apparatus to control an automotive vehicle provided with an automatic transmission of this type, which apparatus includes shift control means for shifting the automatic transmission by engaging one of a plurality of frictional coupling devices while releasing another of the frictional coupling devices, and engine-torque-increase restricting means operable upon an operation of an accelerator pedal during a shift-up action of the automatic transmission to reduce its speed ratio (input speed/output speed), which shift-up action is initiated while the accelerator pedal is in the non-operated position. The engine-torque-increase restricting means is arranged to restrict an increase of the engine torque irrespective of the operation of the accelerator pedal, to prevent a shifting shock of the automatic transmission due to a racing of the engine, until the frictional coupling device to be engaged to effect the shift-up action has been filled with a pressurized working fluid and brought into a state capable of transmitting a torque.

The conventional vehicle control apparatus described above is not arranged to control the engine torque in an inertia phase of the frictional coupling device to be engaged to effect the shift-up action of the automatic transmission, in which the torque capacity of the frictional coupling device is gradually increased. Instead, this vehicle control apparatus is arranged to control the hydraulic pressure applied to the frictional coupling device in question, according to an angle of opening of a throttle valve, for thereby preventing the engine racing, in the inertia phase of the frictional coupling device. However, this hydraulic pressure control inevitably suffers from a delayed control response of the hydraulic pressure. Further, the frictional coupling device in its inertia phase is required to provide the torque capacity including an inertia torque due to a speed variation of an input rotary member of the frictional coupling device. Accordingly, the conventional vehicle control apparatus undesirably suffers from an increase of an amount of slipping of the frictional coupling device, a tendency of the engine racing, an excessive increase of the thermal load and a consequent deterioration of durability of the frictional coupling device, and an increase of a shifting shock of the automatic transmission due to an excessive increase of the engine torque.

SUMMARY OF THE INVENTION

The present invention was made in the light of the background art discussed above. It is therefore an object of the present invention to provide an apparatus operable to control an automotive vehicle, upon generation of an engine-output command requiring an output of an engine of the vehicle during a shift-up action of an automatic transmission of the vehicle initiated in the absence of the engine-output command, so as to permit an efficient control of an output torque or drive torque of the engine according to the engine-output command, while preventing or minimizing a racing phenomenon of the engine, an excessive increase of a thermal load of frictional coupling devices of the automatic transmission, or an excessive shifting shock of the automatic transmission.

The object indicated above may be achieved by any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only.

(1) An apparatus for controlling an automotive vehicle including an engine, and an automatic transmission including a plurality of frictional coupling devices and having a plurality of operating positions having respective different speed ratios, which are selectively established by selective engaging and releasing actions of the plurality of frictional coupling devices, to transmit a rotary motion of the engine to drive wheels of the vehicle, the apparatus being operable upon generation of an engine-output command requiring the engine to provide a desired output during a shift-up action of the automatic transmission by the engaging action of a selected one of the frictional coupling devices initiated in the absence of the engine-output command, characterized by comprising:

a shifting-progress calculating portion operable to calculate a degree of progress of the shift-up action of the automatic transmission after a moment of generation of the engine-output command, on the basis of a change of a rotating speed of a rotary element which changes with the progress of the shift-up action; and a gradual-engine-torque-increase control portion operable to control the engine on the basis of the degree of progress of the shift-up action calculated by the shifting-progress calculating portion, so as to gradually increase an output torque of the engine with the progress of the shift-up action.

(2) An apparatus according to the above mode (1), wherein the rotary element is an input shaft of the automatic transmission, and the shifting-progress calculating portion is operable to calculate the degree of progress of the shift-up action of the automatic transmission, on the basis of a speed difference between a rotating speed of the input shaft and a synchronizing speed of the input shaft after completion of the shift-up action.

(3) An apparatus according to the above mode (1) or (2), further comprising a gradual-increase restricting portion operable upon generation of the engine-output command when a speed difference between the rotating speed of the rotary element and a synchronizing speed of the rotary element after completion of the shift-up action is not larger than a predetermined threshold, the gradual-increase restricting portion restricting an operation of the gradual-engine-torque-increase control portion to control the engine on the basis of the degree of progress of the shift-up action.

(4) An apparatus according to any one of the above modes (1)–(3), further comprising:

an engine-racing detecting portion operable to detect a racing of the engine; and an engine-torque holding portion operable upon detection of the racing of the engine by the engine-racing detecting portion, to disable the gradual-engine-torque-increase control portion to operate, and hold the output torque of the engine constant.

(5) An apparatus according to any one of the above modes (1)–(4), wherein the engine has an electrically operated throttle valve, and the gradual-engine-torque-increase control portion is operable to electrically control the throttle valve so as to gradually increase an opening angle of the throttle valve for thereby gradually increase the output torque of the engine.

(6) An apparatus according to the above mode (5), further comprising an engine-torque-increase limiting portion operable immediately after the generation of the engine-output command during the shift-up action of the automatic transmission, to limit an increase of the opening angle of the throttle valve by the gradual-engine-torque control portion, to a predetermined upper limit.

(7) An apparatus according to the above mode (5) or (6), wherein the shifting-progress calculating portion is operable to calculate, as the degree of progress, a ratio of progress of the shift-up action of the automatic transmission such that the calculated ratio of progress is increased to 1.0 when the rotating speed of the rotary element has been lowered to a control terminating speed which is higher by a predetermined amount than a synchronizing speed of the rotary element after completion of the shift-up action, and the gradual-engine-torque-increase control portion is operable to control the opening angle of the throttle valve on the basis of the calculated ratio of progress such that the opening angle coincides with a target value corresponding to a value of the engine-output control command, when the calculated ratio has been increased to 1.0.

(8) An apparatus according to the above mode (7), wherein the control terminating speed is determined so as to change with an operating speed of the engine, depending upon a control delay of the output torque of the engine, such that the output torque of the engine corresponds to the target value of the opening angle of the throttle valve when the shift-up action of the automatic transmission is completed with the rotating speed of the rotary element being lowered to the synchronizing speed.

(9) An apparatus according to any one of the above modes (1)–(8), wherein the engine-output command represents an operating amount (Acc) of a vehicle accelerating member (50) manually operated by an operator of the vehicle.

The vehicle control apparatus according to the above-described first mode (1) of this invention is arranged to calculate a degree of progress of the shift-up action of the automatic transmission on the basis of a change of the rotating speed of a rotary element which changes with the progress of the shift-up action, and control the engine on the basis of the calculated degree of progress of the shift-up action, so as to gradually increase the output torque of the engine. Accordingly, the output torque of the automatic transmission can be efficiently controlled according to the engine-output command, while an increase of the output torque of the engine is limited, whereby the automatic transmission can be shifted up without a considerably large shifting shock due to the increase of its output torque. The degree of progress of the shift-up action of the automatic transmission corresponds to a torque capacity of the frictional coupling device to be engaged to effect the shift-up action, so that the output torque of the engine is gradually increased with an increase of the torque capacity of the frictional coupling device. Accordingly, the arrangement of the present vehicle control apparatus is effective to minimize the amount of slipping and thermal load of the frictional coupling device and a racing phenomenon of the engine.

The vehicle control apparatus according to the above-described mode (3) of the invention is arranged to restrict the gradual increase of the output torque of the engine on the basis of the degree of progress of the shift-up action of the automatic transmission, if the engine-output command is generated when a speed difference between the present rotating speed of the rotary element and the synchronizing speed of the rotary element is not larger than a predetermined threshold. This arrangement is effective to prevent a racing of the engine and a considerably large shifting shock of the automatic transmission, which would take place due to an abrupt change of the calculated degree of progress of the shift-up action that may arise from an error of detection of the rotating speed of the rotary element. Described in detail, when the speed difference indicated above is relatively small, a ratio of an amount of change of the rotating speed of the rotary element to the speed difference is relatively high, so that a slight amount of change of the rotating speed of the rotary element results in a relatively large amount of change of the calculated degree of progress of the shift-up action, and gives rise to a risk of a large amount of change of the output torque of the engine which corresponds to the relatively large amount of change of the calculated degree of progress.

The vehicle control apparatus according to the above-described mode (4) of this invention is arranged to inhibit the gradual increase of the output torque of the engine and hold the output torque constant, when the racing of the engine is detected. This arrangement prevents a hunting phenomenon (unstable increase and decrease) of the output torque of the engine and the output torque of the automatic transmission. Namely, the racing of the engine indicates an increase of the engine speed that should be lowered in the process of the shift-up action of the automatic transmission, and results in a decrease of the degree of progress of the shift-up action. If the engine torque control by the gradual-engine-torque-increase control portion is continued according to the calculated degree of progress while the engine is in a racing state, the engine torque is once reduced according to the decrease of the degree of progress of the shift-up action. In the meantime, a force of engagement of the frictional coupling device to be engaged to effect the shift-up action of the automatic transmission is increased in a predetermined control pattern, so that the degree of progress is rapidly increased during the reduction of the engine torque, so that the engine torque is subsequently increased. Thus, the engine racing causes the hunting phenomenon of the output torque of the automatic transmission with the output torque of the engine.

According to the above-described modes (5–(8) of the present invention, the output torque of the engine is gradually increased by gradually increasing the opening angle of an electrically operated throttle valve of the engine. In this case, an increase of the output torque of the engine is inevitably delayed with respect to an increase of the opening angle of the throttle valve. The vehicle control apparatus according to the above-described mode (6) is arranged to limit an increase of the opening angle of the throttle valve to a predetermined upper limit, immediately after the moment of generation of the engine-output command, to prevent an excessive increase of the engine torque due to the control delay of the engine torque in the progress of the shift-up action of the automatic transmission.

The vehicle control apparatus according to the above-described mode (7) of this invention is arranged to calculate, as the degree of progress of the shift-up action of the automatic transmission, a ratio of progress of the shift-up action such that the calculated ratio of progress is increased to 1.0 when the rotating speed of the rotary element has been lowered to a control terminating speed which is higher by a predetermined amount than a synchronizing speed of the rotary element after completion of the shift-up action. The present apparatus is further arranged to control the opening angle of the throttle valve on the basis of the calculated ratio of progress such that the opening angle of the throttle valve coincides with a target value corresponding to a value of the engine-output command, when the calculated ratio has been increased to 1.0. Accordingly, the engine torque can be controlled to the value corresponding to the target opening angle of the throttle valve upon completion of the shift-up action of the automatic transmission with the rotating speed of the rotary element being lowered to the synchronizing speed, even in the presence of the control delay of the engine torque. According to the above-described mode (8), the control terminating speed is determined depending upon the control delay of the output torque of the engine, such that the output torque of the engine corresponds to the target value of the opening angle of the throttle valve when the shift-up action of the automatic transmission is completed with the rotating speed of the rotary element being lowered to the synchronizing speed. Accordingly, the engine torque and the output torque of the automatic transmission upon completion of the shift-up action can be controlled to the values corresponding to the value of the engine-output command, even in the presence of the preceding control delay of the engine torque.

The vehicle control apparatus according to the above-described mode (8) is further arranged such that the control terminating speed is determined so as to change with the operating speed of the engine, in view of a fact that the control delay of the engine torque varies with the engine speed, that is, increases with a decrease of the engine speed. This arrangement permits the engine torque upon completion of the shift-up action to be held constant at the value corresponding to the target opening angle of the throttle valve, irrespectively of the engine speed.

The vehicle control apparatus constructed according to the principle of the present invention is effective to control the engine, particularly when the engine-output command is generated in an inertia phase of a shift-up action of the automatic transmission in which one of the plurality of frictional coupling devices is gradually engaged to have a torque capacity, with a result of a decrease of the rotating speed of the input rotary member of the automatic transmission, while anther of the frictional coupling devices is gradually released. However, the present vehicle control apparatus is equally applicable to a vehicle having an automatic transmission which incorporates one-way clutches and which is shifted up by merely engaging one of the frictional coupling devices.

The present vehicle control apparatus is suitably applicable to a vehicle having an automatic transmission of planetary gear type including a plurality of planetary gear sets, but is applicable to a vehicle having an automatic transmission of any other types, such as an automatic transmission of parallel-axes type having a plurality of power input paths selectively connected to the engine. The frictional coupling devices of the automatic transmission may be multiple-disc or single-disc type clutches and brakes, or belt-type brakes, which are engaged by respective hydraulic actuators. The shift-up action of the automatic transmission may be effected by engaging one of the frictional coupling devices, by controlling a hydraulic pressure control valve (e.g., linear solenoid valve) in a feed-forward fashion, to control a hydraulic pressure of a working oil in an engaging chamber of the hydraulic actuator in a predetermined control pattern. For instance, the control pattern has a fast-fill region in which the engaging chamber of the hydraulic actuator is rapidly filled with the pressurized working oil, a low-pressure stand-by region in which the hydraulic pressure in the engaging chamber is held at a predetermined low level, and a sweep-up region in which the hydraulic pressure in the engaging chamber is gradually increased from the low level to place the frictional coupling device in its fully engaged state.

The frictional coupling device to be engaged to effect the shift-up action of the automatic transmission is placed in the inertia phase in the sweep-up region of the control pattern of the hydraulic pressure in which the shift-up action progresses with a decrease of the rotating speed of the input rotary member of the transmission. To prevent a racing phenomenon of the engine upon generation of the engine-output command (upon depression of an accelerator pedal, for example) when the frictional coupling device is placed in the inertia phase, the hydraulic pressure to be applied to the frictional coupling device (engaging chamber of its hydraulic actuator) is preferably controlled in one of two different control patterns, which is selected depending upon whether the engine-output command is present or not. According to the control pattern selected in the presence of the engine-output command, the hydraulic pressure in the low-pressure stand-by region and the sweep-up region are made higher than those according to the other control pattern selected in the absence of the engine-output command.

The present vehicle control apparatus is suitably applicable to a vehicle provided with an internal combustion engine which is operable to provide an output torque by combustion of a fuel and which has an electronically controlled throttle valve an angle of opening of which is electrically controllable or variable. However, the engine may be of any other type provided with an electrically operated torque changing device capable of changing the output torque by controlling ignition timings or adjusting an amount of lift of each intake valve. Where the engine is provided with a mechanical throttle valve, the electrically operated torque changing device is controlled on the basis of the opening angle of the mechanical throttle valve, to control the output torque of the engine. Further, the principle of the present invention is applicable to a vehicle provided with an engine not provided with a throttle valve, as long as the output of the engine is controllable.

The shifting-progress calculating portion may be arranged to calculate, as the degree of progress of the shift-up action of the automatic transmission, a ratio of progress of the shift-up action according to the following equation (1), wherein "nts4x" represents a present value of a speed difference between the rotating speed of the rotary element (which changes with the progress of the shift-up action) and a synchronizing speed of the rotary element after completion of the shift-up action, while "nts4xm" represents an initial value of that speed difference upon generation of the engine-output command. The ratio calculated by the shifting-progress calculating portion is a ratio of an amount of change (nts4xm−nts4x) of the present value of the speed difference from the initial value, to the initial value. The shifting-progress calculating portion may be arranged to calculate a ratio of progress of the shift-up action according to the following equation (2), which uses the control terminating speed (synchronizing speed+ofst) in place of the synchronizing speed, as in the above-described mode (7) of the invention. In this case, the calculated ratio is 1.0 when the rotating speed of the rotary element has been lowered to the control terminating speed.

$$\text{ratio}=(nts4xm-nts4x)/nts4xm \tag{1}$$

$$\text{ratio}=(nts4xm-nts4x)/(nts4xm-ofst) \tag{2}$$

Although the shifting-progress calculating portion is preferably calculate the degree of progress of the shift-up action of the automatic transmission on the basis of the rotating speed of an input shaft of the automatic transmission, as in the above-described mode (2) of the invention, the rotating speed of any other rotary member of the automatic transmission may be used to calculate the degree of progress of the shift-up action.

The gradual-engine-torque-increase control portion may be arranged to calculate a throttle command value TA representative of an opening angle of an electrically (electronically) operated throttle valve of the engine according to the following equation (3), which includes the above-indicated ratio of progress "ratio" calculated by the shifting-progress calculating portion, a value "tabas" which is the throttle command value TA upon generation of the engine-output command, and a target value TA* of the throttle command value which corresponds to a present value of the engine-output command (which is represented by an operating amount of an accelerator pedal, for example). The throttle command value TA and the value "tabas" correspond to the opening angle of the throttle valve and the output torque of the engine. The value "tabas" may be the value of the throttle command value TA in an idling state of the engine with the accelerator pedal placed in the non-operated position.

$$TA=\text{ratio}\times(TA^*-tabas)+tabas \tag{3}$$

The gradual-increase restricting portion provided in the vehicle control apparatus according to the above-indicated mode (3) may be arranged to inhibit an operation of the gradual-engine-torque-increase control portion to control the engine on the basis of the degree of progress of the automatic transmission, and hold the output torque of the engine at a value upon generation of the engine-output command (at a value when the engine was placed in the idling state). However, the gradual-increase restricting portion may be arranged to restrict the operation of the gradual-engine-torque-increase control portion such that the output torque of the engine is increased at a predetermined rate TASWMAX, irrespective of the value of the engine-output command, for giving a feeling of acceleration of the vehicle while preventing a racing of the engine. Where the output torque of the engine is controlled by an electrically or electronically operated throttle valve, a throttle command value TA representative of an opening angle of the throttle valve is determined according to the following equation (4), which includes the predetermined rate TASWMAX and a time which has passed after a moment of generation of the engine-output command.

$$TA=\text{time}\times TASWMAX \tag{4}$$

The predetermined threshold NDOUKI of the speed difference "nts4x" used by the gradual-increase restricting portion may be a lower limit of the speed difference "nts4x" above which the vehicle does not suffer from a racing phenomenon of the engine or an excessively large shifting shock of the automatic transmission which arises from large amounts of change of the calculated degree of progress of the shift-up action and the output torque of the engine due to an error of detection of the rotating speed of the rotary element, with a small value of the denominator of the previously indicated equation (1) or (2), where the output torque of the engine is effected according to the calculated degree of progress of the shift-up action according to the equation (1) or (2). Therefore, after the speed difference "nts4x" has exceeded the threshold NDOUKI with the racing of the engine, this threshold NDOUKI may be used in place of the initial value "nts4xm". In this case, the ratio of progress used by the gradual-engine-torque-increase control portion is calculated according to the following equation (5) or (6).

$$\text{ratio}=(NDOUKI-nts4x)/NDOUKI \tag{5}$$

$$\text{ratio}=(NDOUKI-nts4x)/(NDOUKI-ofst) \tag{6}$$

The engine-torque-increase limiting portion in the vehicle control apparatus according to the above-described mode (6) of this invention may be arranged to limit the throttle command value TA to a value not higher than a predetermined threshold, but is preferably arranged to increase the opening angle at a rate not higher than a predetermined upper limit, for gradually increasing the output torque of the automatic transmission so as to give a suitable feeling of acceleration of the vehicle while preventing a racing phenomenon of the engine. For example, the engine-torque-increase limiting portion may be arranged to control the throttle command value TA according to the equation (4) indicated above. The engine-torque-increase limiting portion is provided to prevent an abrupt increase of the output torque of the engine immediately after the generation of the engine-output command, which would take place in a phase of the shift-up action of the automatic transmission in which the actual increase of the engine torque is delayed with respect to an increase of the opening angle of the throttle valve by the gradual-engine-torque-increase control portion. The engine-torque-increase limiting portion is desirably arranged to limit the throttle command value TA for a predetermined time depending upon the degree of the above-indicated control delay of the engine torque, even if the throttle command value TA is once reduced below the upper limit.

According to the above-described mode (7) of this invention, the ratio of progress of the shift-up action of the automatic transmission is calculated such that the calculated ratio of progress is increased to 1.0 when the rotating speed of the rotary element has been lowered to the control terminating speed, and the opening angle of the throttle valve is controlled on the basis of the calculated ratio of progress such that the opening angle coincides with the target value corresponding to the value of the engine-output command when the calculated ratio has been increased to 1.0. However, the equation to calculate the ratio of progress need not be formulated such that the ratio of progress calculated according to the equation is increased to 1.0 when the rotating speed of the rotary element has been lowered to the control terminating speed. In this respect, it is noted that some engines have substantially no control delay of their output torque with respect to an increase of the opening angle of the throttle valve immediately after the generation of the engine-output command. For the engine of this nature, the opening angle need not be increased to the target value corresponding to the value of the engine-output command, before the rotating speed of the rotary element has been lowered to the synchronizing speed, that is, before the shift-up action of the automatic transmission is completed. In other words, the opening angle may be increased to the target value almost concurrently with the completion of the shift-up action.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which:

FIG. 2 is a view indicating a relationship between combinations of operating states of clutches and brakes of an automatic transmission of the vehicle drive system shown in FIG. 1, and operating positions of the automatic transmission to be established by the respective combinations of the operating states;

DETAILED DESCRIPTION OF THE PREFERRED EMBODIMENTS

Figure 1:
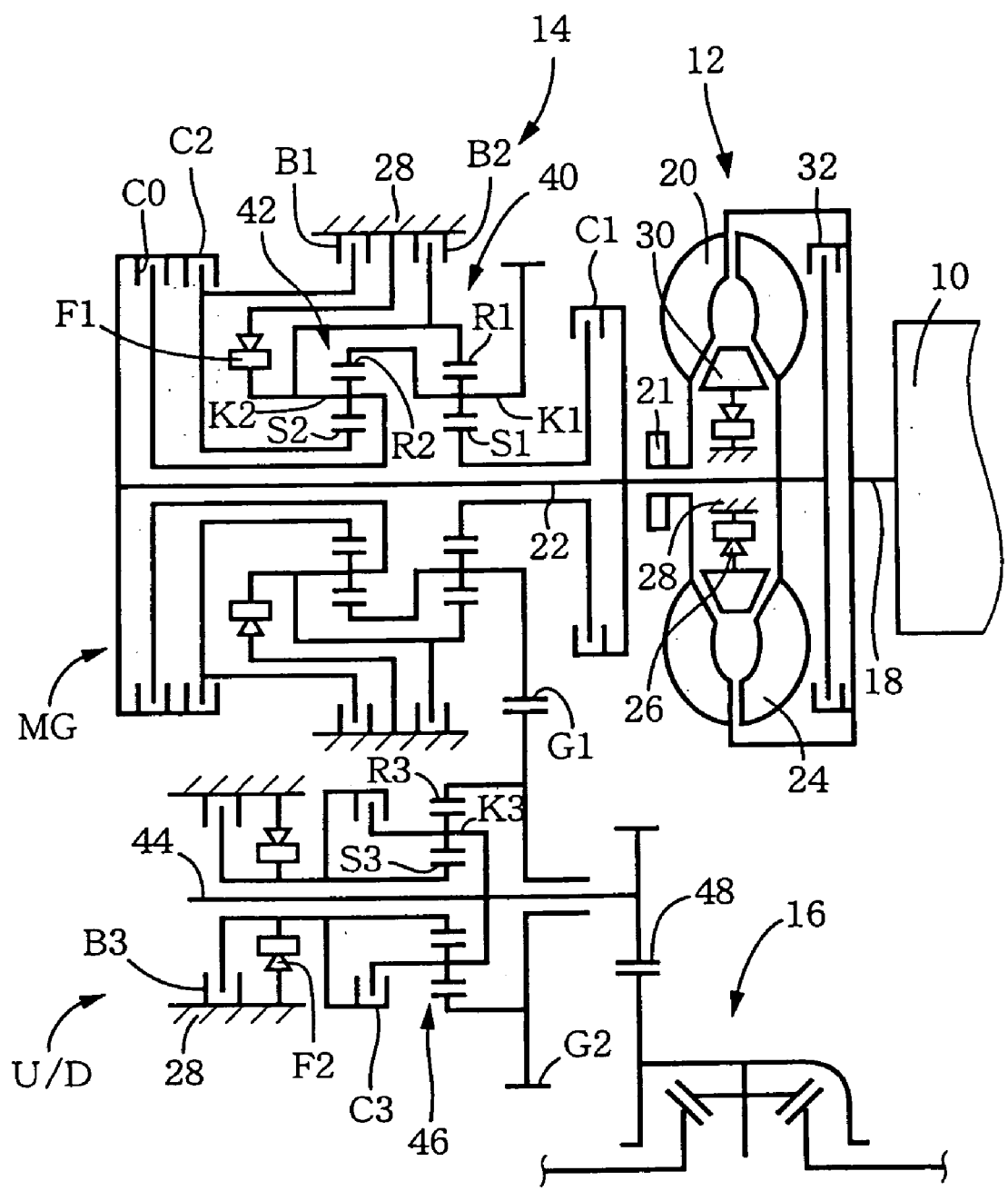
FIG. 1 is a schematic view showing a part of a drive system of a vehicle, to which the principle of the present invention is applicable.

Referring first to the schematic view of FIG. 1, there is shown an arrangement of a drive system of an automotive vehicle in the form of a transverse FF (front-engine front-drive) vehicle that is controlled by a vehicle control apparatus constructed according to one embodiment of this invention. The vehicle drive system includes an internal combustion engine 10 such as a gasoline engine, an output of which is transmitted to drive wheels (front wheels not shown) of the vehicle through a power transmitting device including a torque converter 12, an automatic transmission 14, and a differential gear device 16. The torque converter 12 includes a pump impeller 20 connected to a crankshaft 18 of the engine 10, a turbine impeller 24 connected to an input shaft 22 of the automatic transmission 14, a stator 30 fixed through a one-way clutch 26 to a stationary or non-rotatable member in the form of a housing 28, and a lock-up clutch 32 provided to directly couple the crankshaft 18 to the input shaft 22 through a damper (not shown). The pump impeller 20 is provided with a mechanically operated oil pump 21 such as a gear pump, which is driven by the pump impeller 20 to deliver a pressurized working oil when the pump impeller 20 is rotated by the engine 10. The working oil is used by the automatic transmission 14 and the lock-up clutch 32, and is also used for lubricating various portions of the vehicle drive system. The engine 10 serves as a drive power source for driving the vehicle, and the torque converter 12 serves as a fluid coupling provided between the engine 10 and the automatic transmission 14.

The automatic transmission 14 is disposed coaxially with the input shaft 22, and includes a first planetary gear set 40 and a second planetary gear set 42 both of which are of a single-pinion type and a so-called CR-CR coupling type wherein a carrier K1 and a ring gear R1 of the first planetary gear set 40 are respectively connected to a ring gear R2 and a carrier K2 of the second planetary gear set 42. The automatic transmission 14 further includes a third planetary gear set 46 disposed coaxially with a countershaft 44 which is parallel to and spaced apart from the input shaft 22 in the radial direction. The automatic transmission 14 also includes an output gear 48 which is fixed to one axial end of the countershaft 44 and meshes with the differential gear device 16. The planetary gear sets 40, 42, 46 include rotary elements in the form of sun gears S1–S3, ring gears R1–R3, and carriers K1–K3 rotatably supporting planetary gears that mesh with the sun gears S1–S3 and ring gears R1–R3. These sun gears S1–S3, ring gears R1–R3 and carriers K1–K3 are selectively connected to each other by four clutches C0–C3, selectively fixed to the housing 28 by three brakes B1–B3, and selectively connected to each other or fixed to the housing 28 by two one-way clutches F1, F2 depending upon the rotating directions. The differential gear device 16 is symmetrically constructed with respect to its axis (drive axle of the vehicle), and a lower half of the differential gear device 16 is not shown in FIG. 1.

The first and second planetary gear sets 40, 42 disposed coaxially on the input shaft 22 cooperate with the clutches C0–C2, brakes B1, B2 and one-way clutch F1 to constitute a primary shifting portion MG which has four forward-drive positions and one rear-drive position. On the other hand, the third planetary gear set 45 disposed coaxially with the countershaft 44 cooperates with the clutch C3, brake B3 and one-way clutch F2 to constitute a secondary shifting portion or underdrive portion U/D. In the primary shifting portion MG, the input shaft 22 is connected through the clutches C0, C1, C2 to the carrier K2 of the second planetary gear set 42, the sun gear S1 of the first planetary gear set 40, and the sun gear S2 of the second planetary gear set 42. The ring-gear R1 of the first planetary gear set 40 and the carrier K2 of the second planetary gear set 42 are connected to each other, while the ring gear R2 of the second planetary gear set 42 and the carrier K1 of the first planetary gear set 40 are connected to each other. The sun gear S2 of the second planetary gear set 42 is fixed through the brake B1 to the stationary member in the form of the housing 28, while the ring gear R1 of the first planetary gear set 40 is fixed through the brake B2 to the housing 28. The one-way clutch F1 is disposed between the carrier K2 of the second planetary gear set 42 and the housing 28. A first counter gear G1 fixed to the carrier K1 of the first planetary gear set 40 meshes with a second counter gear G2 fixed to the ring gear R3 of the third planetary gear set 46. In the underdrive portion U/D, the carrier K3 and sun gear S3 of the third planetary gear set 46 are connected to each other through the clutch C3, and the brake B3 and the one-way clutch F2 are disposed in parallel with each other, between the sun gear S3 and the housing 28.

Figure 3:
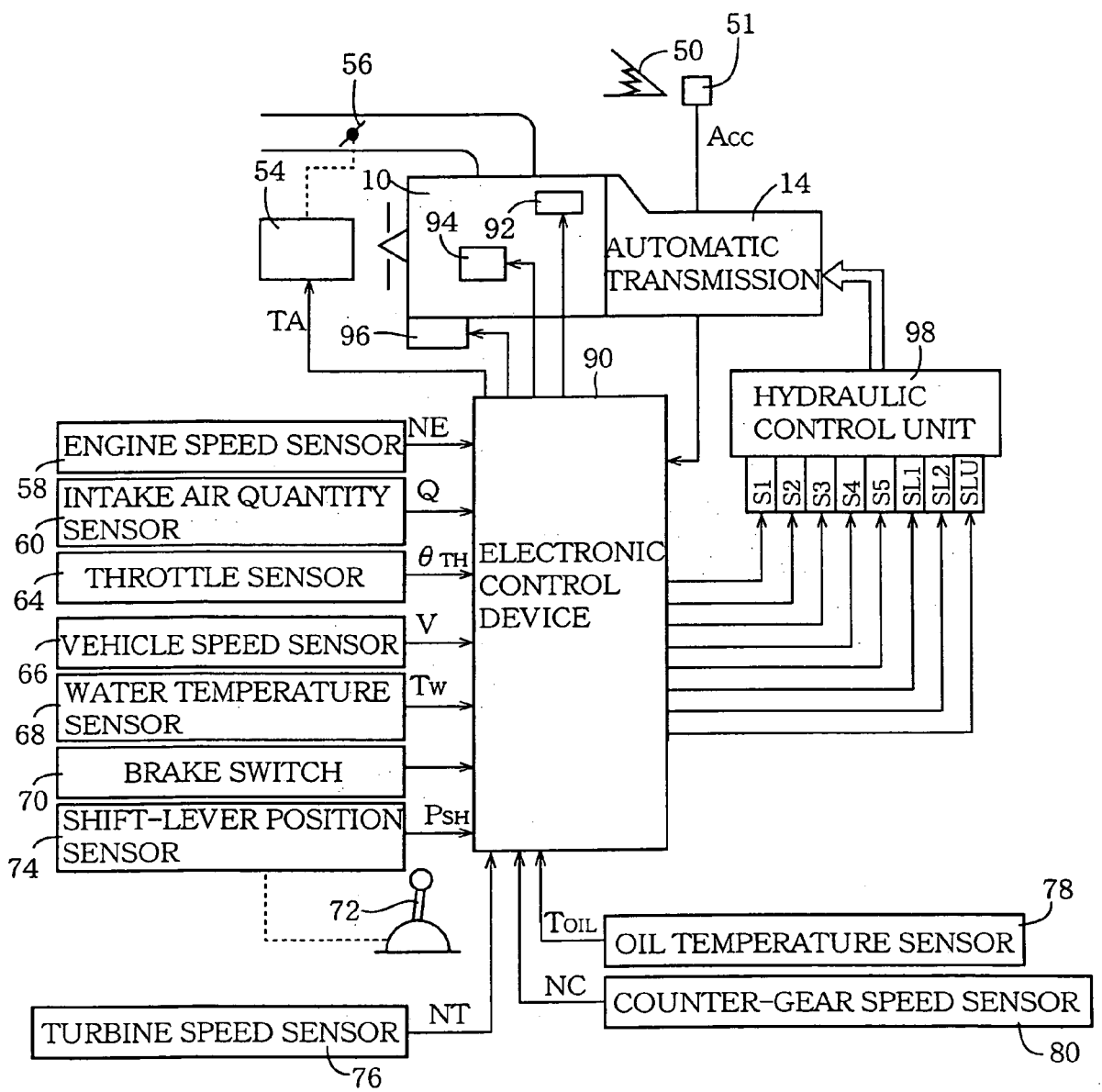
FIG. 3 is a block diagram illustrating a control system operable to control an engine and the automatic transmission of the vehicle drive system.
Figure 4:
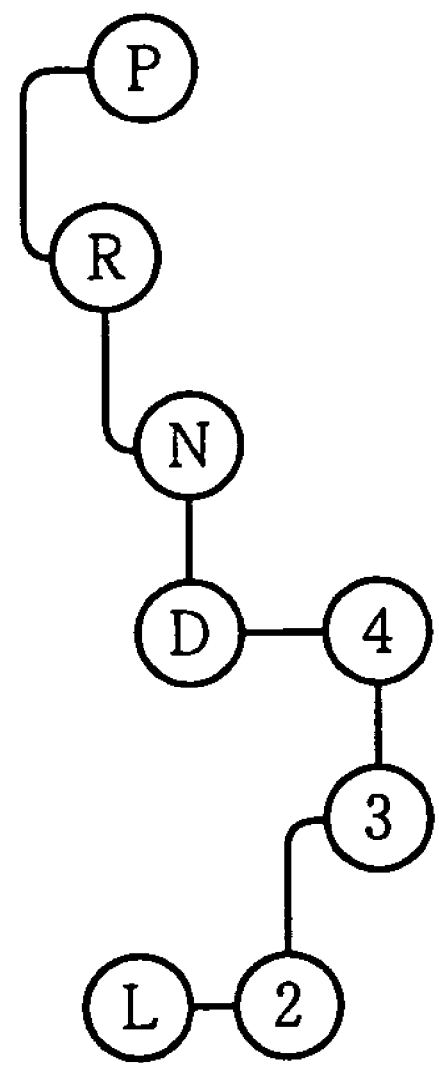
FIG. 4 is a view showing operating positions of a shift lever shown in FIG. 3.

Each of the clutches C0, C1, C2, C3 and brakes B1, B2, B3 (hereinafter collectively referred to as clutches C and brakes B) is a hydraulically operated frictional coupling device such as a multiple-disc clutch or band brake which is engaged and released by a hydraulic actuator, by selective energization and de-energization of solenoid valves S1–S5 and linear solenoid valves SL1, SL2, SLU incorporated in a hydraulic control unit 98 shown in FIG. 3, and by an operation of a manual valve (not shown), so as to effect a switching operation of a hydraulic circuit for controlling the hydraulic actuator. As also shown in FIG. 3, the vehicle is provided with a shift lever 72, which has a total of eight operating positions: parking position P; reverse drive position R; neutral position N; forward drive position D; $4^{th}$-speed position 4; $3^{rd}$-speed position 3; $2^{nd}$-speed position 2; and a low-gear position L, as shown in FIG. 4. By selecting one of combinations of the engaged and released states of the clutches C0–C3 and brakes B1–B3, the automatic transmission 14 is shifted to a corresponding one of its operating positions: five forward-drive positions $1^{st}$, $2^{nd}$, $3^{rd}$, $4^{th}$ and $5^{th}$; one rear-drive position R; and neutral position N (parking position P), depending upon the currently selected position of the shift lever 72, as indicated in FIG. 2 wherein "O" and "X" respectively indicate the engaged and released states of each frictional coupling device, and "A" indicates the engaged state of the one-way clutches F1, F2 when a vehicle drive force is transmitted from the engine 10 toward the vehicle drive wheels. When the shift lever 72 is placed in the forward drive position D, one of the five forward-drive positions $1^{st}$ through $5^{th}$ of the automatic transmission 14 is selectable on the basis of an operating amount Acc of an accelerator pedal 50 and a running speed V of the vehicle and according to shift-up and shift-down boundary lines shown in FIG. 6. The boundary lines are represented by a shifting data map stored in a read-only memory (ROM) of an electronic control device 90 which will be described. When the shift lever 72 is placed in the $4^{th}$-speed position, one of the $1^{st}$-speed, $2^{nd}$-speed, $3^{rd}$-speed and $4^{th}$-speed positions is selectable. When the shift lever 72 is placed in the $3^{rd}$-speed position, one of the $1^{st}$-speed, $2^{nd}$-speed and $3^{rd}$-speed positions is selectable. When the shift lever 72 is placed in the $2^{nd}$-speed position, one of the $1^{st}$-speed and $2^{nd}$-speed positions is selectable. When the shift lever 72 is placed in the low-gear position, the automatic transmission 14 is placed in the $1^{st}$-speed position. When the shift-lever 72 is placed in the parking position P or neutral position N, the automatic transmission 14 is placed in the neutral or non-drive position in which the drive force cannot be transmitted from the engine 10 to the drive wheels. In the parking position P of the shift lever 72, the drive wheels are mechanically locked with a suitable locking mechanism (not shown).

Figure 5:
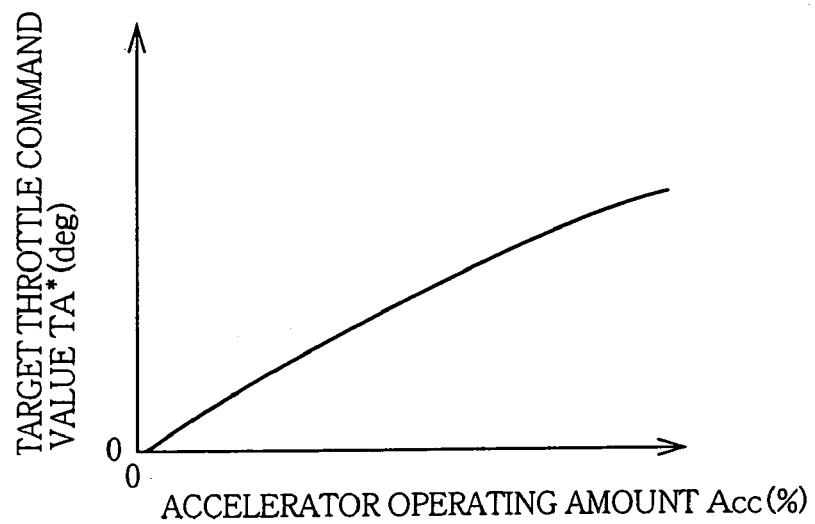
FIG. 5 is a graph indicating one example of a relationship between an operating amount Acc of an accelerator pedal and a target throttle command value TA*, which relationship is used by an electronic control device to control a throttle actuator of the engine.

Referring to the block diagram of FIG. 3, there is shown a control system for controlling the engine 10, automatic transmission 14 and other devices of the automotive vehicle. The control system includes the above-indicated electronic control device 90, which receives an output signal of an acceleration sensor 51 representative of the operating amount Acc of the accelerator pedal 50. The accelerator pedal 50 serves as a vehicle accelerating member manually operable by an operator of the vehicle, and the operating amount Acc detected by the acceleration sensor 51 represents a desired output of the engine 10, that is, an output of the engine 10 as desired or required by the vehicle operator. The engine 10 is provided with an electronically controlled throttle valve 56 disposed within its intake pipe and controlled by a throttle actuator 54. Described in detail, an opening angle $\theta_{TH}$ of the throttle valve 56 is controlled by the throttle actuator 54, according to a throttle command value TA received from the electronic control device 90. The control device 90 determines a target value TA* of the throttle command value TA on the basis of the operating amount Acc of the accelerator pedal 50 detected by the acceleration sensor 51, and according to a predetermined relationship between the target throttle command value TA* and the operating amount Acc. An example of this relationship is shown in FIG. 5. The relationship is represented by a data map stored in the ROM of the control device 90. The relationship is determined such that the target throttle command value TA* gradually increases with an increase in the detected operating amount Acc of the accelerator pedal 50. The throttle command value TA is determined on the basis of the determined target value TA*, as described below in detail, with respect to steps S6 and X10 of FIGS. 8 and 9. The output signal of the accelerator sensor 51 which represents the operating amount Acc of the accelerator pedal 50 functions as an engine-output command requiring the engine 10 to provide an output desired by the vehicle operator.

The electronic control device 90 further receives: an output signal of an engine speed sensor 58 representative of a speed NE of the engine 10; an output signal of an intake air quantity sensor 60 representative of an intake air quantity Q of the engine 10; an output signal of a throttle sensor 64 provided with an engine-idling switch, which represents an idling state of the engine 10 (a fully closed state of the throttle valve 56), and the opening angle $\theta_{TH}$ of the throttle valve 56; an output signal of a vehicle speed sensor 66 representative of a speed $N_{OUT}$ of the countershaft 44, from which the vehicle speed V can be calculated; an output signal of a water temperature sensor 68 representative of a temperature $T_W$ of a coolant water of the engine 10; an output signal of a brake switch 70 indicating whether a brake pedal is in operation or not; an output signal of a shift-lever position sensor 74 representative of the currently selected position $P_{SH}$ of the shift lever 72; an output signal of a turbine speed sensor 76 representative of a speed NT of the turbine impeller 24 (=speed NIN of the input shaft 22); an output signal of an oil temperature sensor 78 representative of a temperature TOIL of the working oil within the hydraulic control unit 98; and an output signal of a counter-gear speed sensor 80 representative of a speed NC of the first counter gear G1. The brake switch 70 is turned on when the brake pedal is depressed to activate a service brake system of the vehicle, and is turned off when the brake pedal is returned to its non-operated position.

The electronic control device 90 is constituted by a so-called microcomputer incorporating a central processing unit (CPU), a random-access memory (RAM), the above-indicated read-only memory (ROM) and an input/output interface. The CPU operates to process the received signals according to control programs and data maps stored in the ROM, for controlling the engine 10 and the automatic transmission 14, while utilizing a temporary data storage function of the RAM. The control device 90 has two major control portions, that is, an engine control portion 100, and a transmission-shifting control portion 120, as indicated in the block diagram of FIG. 7.

The engine control portion 100 is arranged to control the throttle actuator 54 for controlling the opening angle $\theta_{TH}$ of the throttle valve 56, and control a fuel injector valve 92 for controlling the amount of injection of a fuel into the engine 10. The engine control portion 100 is further arranged to control an ignition device 94 for controlling an ignition timing of the engine 10, and control a starter motor 96 for cranking the crankshaft 18 to start the engine 10. The engine control portion 100 includes a throttle control portion 114 operable to calculate the target throttle command value TA* on the basis of the detected operating amount Acc of the accelerator pedal 50 and according to the predetermined relationship of FIG. 5, determine the throttle command value TA on the basis of the target value TA*, and control the throttle actuator 54 according to the determined throttle command value TA* to control the operating angle $\theta_{TH}$ of the throttle valve 56, such that the operating angle $\theta_{TH}$ of the throttle valve 56 increases with an increase in the operating amount Acc of the accelerator pedal. The throttle actuator 54 and the throttle valve 56 operate to function as a device for electrically controlling the output or torque of the engine 10.

Figure 6:
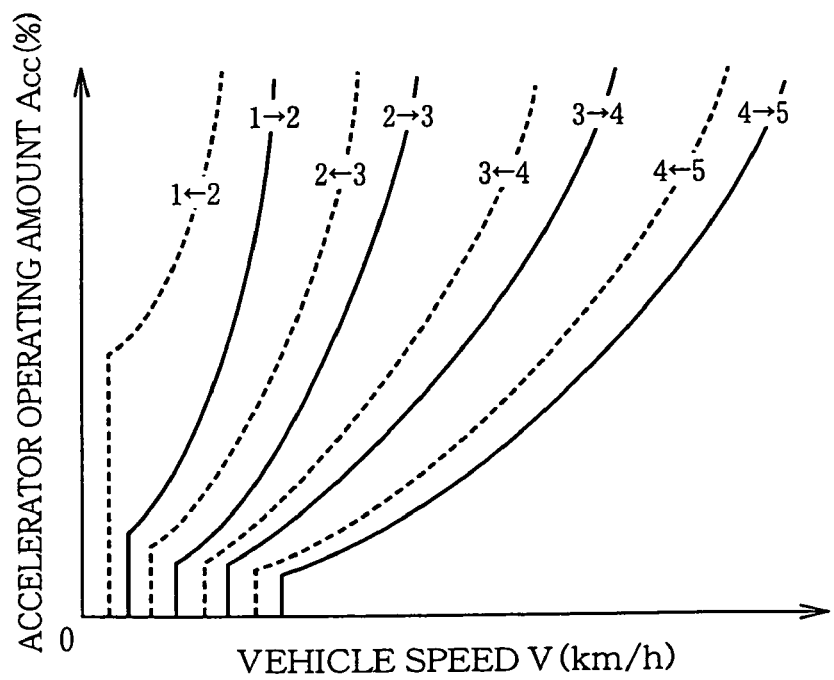
FIG. 6 is a graph indicating an example of shift-up and shift-down boundary lines used by the electronic control device to control shifting actions of the automatic transmission.

The transmission-shifting control portion 120 is arranged to select one of the operating positions of the automatic transmission 14 on the basis of the detected operating amount Acc of the accelerator pedal 50 and the detected vehicle speed V, and according to the predetermined shift-up and shift-down boundary lines stored in the ROM. The transmission-shifting control portion 120 selectively energizes and de-energizes the solenoid valves S1–S5 of the hydraulic control unit 98 and continuously controls the amount of an electric current to be applied to the linear solenoid valves SL1, SL2, SLU, to control the operating states of the frictional coupling devices (clutches C and brakes B) for shifting the automatic transmission 14 to the selected operating position, while preventing a shifting shock due to a variation in the vehicle drive force and deterioration of durability of the friction members of the frictional coupling devices. In the graph of FIG. 6, the solid lines are the shift-up boundary lines, while the broken lines are the shift-down boundary lines. These shift-up and shift-down boundary lines are determined so that the automatic transmission 14 is shifted down to increase its speed ratio (input speed $N_{IN}$/output speed $N_{OUT}$) as the vehicle speed V is lowered and/or the operating amount Acc of the accelerator pedal 50 is increased. In the graph of FIG. 6, numerals "1" through "5" respectively indicate the $1^{st}$-speed position through the $5^{th}$-speed positions of the automatic transmission 14.

Figure 14:
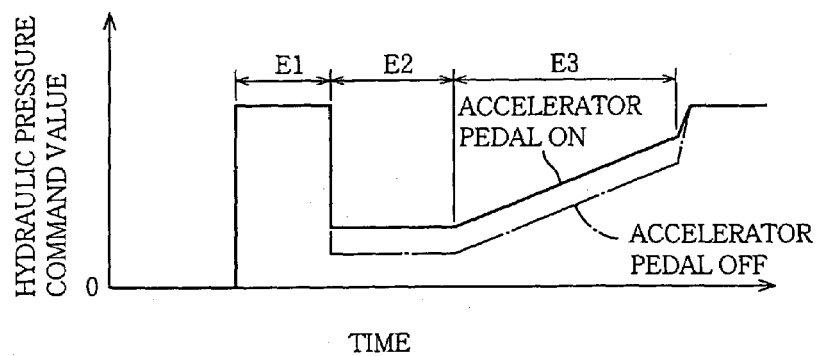
FIG. 14 is a view for explaining a pattern of hydraulic pressure control of one of two clutches which is to be engaged during a clutch-to-clutch shift-up action of the automatic transmission, which is effected by concurrent engaging and releasing actions of those two clutches.

A shift-up action of the automatic transmission 14 from the $2^{nd}$-speed position to the $3^{rd}$-speed position, is effected by engaging the clutch C0 while releasing the brake B1, and a shift-up action of the automatic transmission 14 from the $3^{rd}$-speed position to the $4^{th}$-speed position is effected by engaging the brake B1 while releasing the clutch C1. Further, a shift-up action of the automatic transmission 14 from the $4^{th}$-speed position to the $5^{th}$-speed position is effected by engaging the clutch C3 while releasing the brake B3. These shift-up actions are referred to as "clutch-to-clutch shifting actions". Engaging hydraulic pressures $P_{C0}$, $P_{B1}$ and $P_{C3}$ to be respectively applied to engaging chambers of the clutch C0, brake B1 and clutch C3 for engaging actions of those frictional coupling clutches are directly controlled in a feed-forward fashion according to the output pressures of the linear solenoid valve SL1 or SL2, in a predetermined control pattern as indicated in FIG. 14 by way of example. The control pattern has a fast-fill region E1 in which the engaging chamber of each frictional coupling device in question is rapidly filled with the pressurized oil, a low-pressure stand-by region E2 in which the hydraulic pressure in the engaging chamber is held at a predetermined low level, and a sweep-up region E3 in which the hydraulic pressure in the engaging chamber is gradually increased from the low level to place the frictional coupling device in its fully engaged state. The hydraulic pressure levels and the lengths of time of the regions E1, E2 and E3 of the control pattern are suitably adjusted by learning compensation. In the sweep-up region E3, the input speed NIN of the frictional coupling device (speed NT of the turbine impeller 24) is lowered with a progress of the shift-up action, and the frictional coupling device is placed in the inertia phase. If the accelerator pedal 50 is operated in this inertia phase, the engine 10 tends to easily undergo a racing phenomenon. To prevent this racing phenomenon, the engaging hydraulic pressure is controlled in one of two different control patterns, which is selected depending upon whether the accelerator pedal 50 is in operation or not. In FIG. 14, solid line indicates the control pattern selected when the accelerator pedal 50 is in operation, and broken line indicates the control pattern selected when the accelerator pedal 50 is not in operation. According to the control pattern selected when the accelerator pedal 50 is in operation, the hydraulic pressures in the low-pressure stand-by region E2 and the sweep-up region E3 are made higher than those according to the other control pattern. The control pattern is switched from one of the two patterns to the other, even in the progress of the shift-up action.

The transmission-shifting control portion 120 is further arranged to compensate or adjust the engaging hydraulic pressures of the frictional coupling devices, in the event of a change of the output torque of the engine 10, that is, a change of the input torque of the automatic transmission 14. This compensation or adjustment is made depending upon a cause for the change of the engine torque, such as a fuel-cut control to cut a supply of the fuel to the engine 10, an operation of an air conditioner using an air compressor driven by the engine 10, or an engaging action or a slipping action of the lock-up clutch 32 of the torque converter 12.

If the accelerator pedal 50 is operated, that is, if an engine-output control command requiring an output of the engine 10 is generated in the inertia phase of a clutch-to-clutch shifting action of the automatic transmission 14 initiated in the absence of the engine-output control command (when the accelerator pedal 50 is not in operation), the switching of the control pattern to control the engaging hydraulic pressure may not permit a sufficiently rapid rise of the engaging hydraulic pressure, and the frictional coupling device in its inertia phase is required to provide the torque capacity including an inertia torque $T_I$ due to a speed variation of the engine 10 or a variation of the input speed of the frictional coupling device, undesirably resulting in risks of an increase of an amount of slipping of the frictional coupling device, a tendency of the engine racing, an excessive increase of the thermal load and a consequent deterioration of durability of the frictional coupling device, and an increase of a shifting shock of the automatic transmission 14 due to an excessive increase of the engine torque $T_E$.

Figure 7:
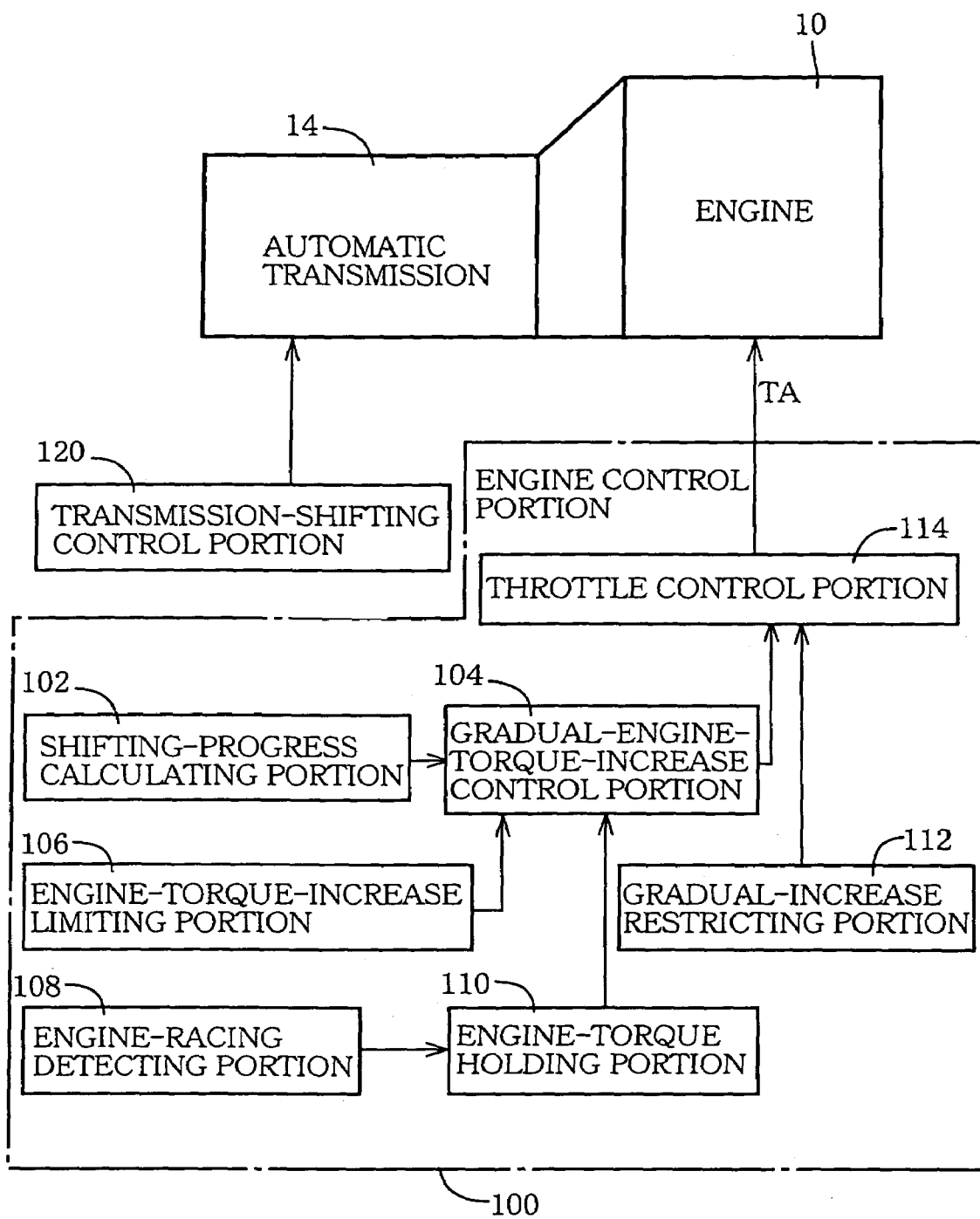
FIG. 7 is a block diagram illustrating major functional portions of the electronic control device, which relate to an engine torque control upon generation of an engine-output command requiring the engine to provide a desired output during a shift-up action of the automatic transmission initiated in the absence of the engine-output command.
Figure 9:
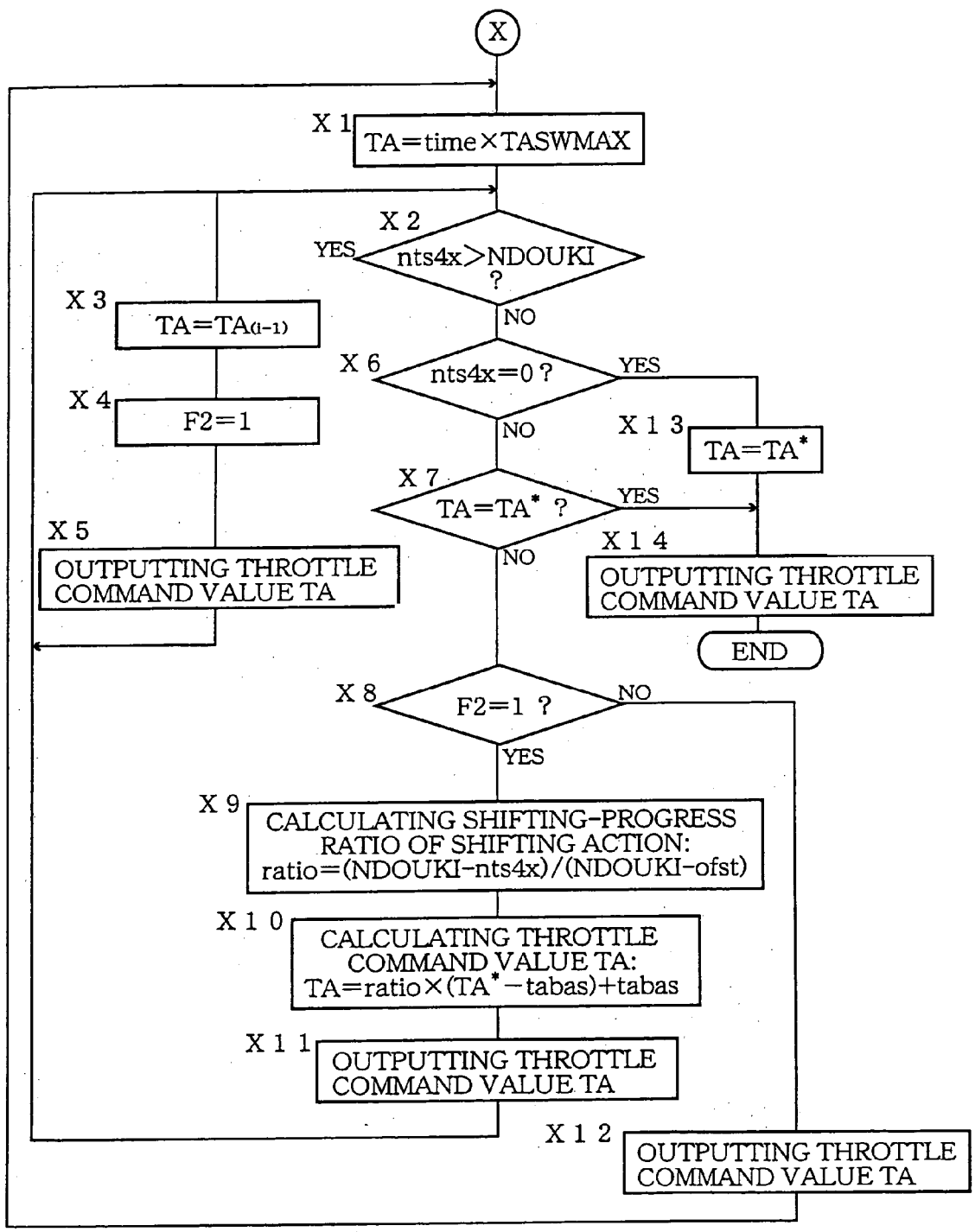
Figure 10:
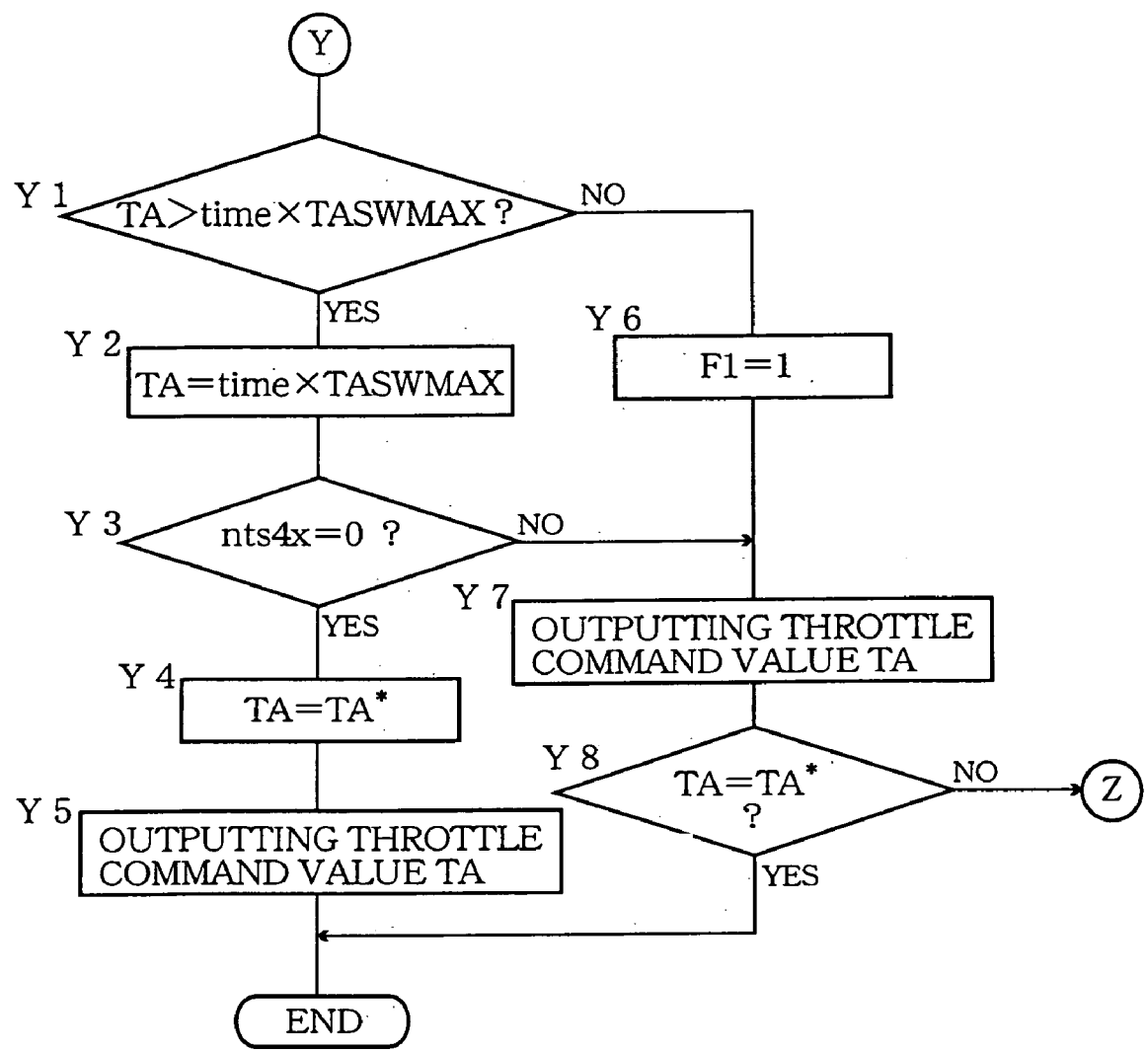

To prevent the above-described risks, the engine control portion 100 of the electronic control device 90 includes a shifting-progress calculating portion 102, a gradual-engine-torque-increase control portion 104, an engine-torque-increase limiting portion 106, an engine-racing detecting portion 108, an engine-torque holding portion 110, and a gradual-increase restricting portion 112, as shown in FIG. 7. When the accelerator pedal 50 is operated during a shift-up action of the automatic transmission 14 initiated while the accelerator pedal 50 is not in operation, the engine control portion 100 executes an engine torque control routine illustrated in the flow charts of FIGS. 8–10. The gradual-increase restricting portion 112 is constituted by a portion of the control device 90 assigned to implement steps S4, X1 and X12 of the engine torque control routine, and the shifting-progress calculating portion 102 is constituted by a portion of the control device 90 assigned to implement steps S5 and X9 of the control routine, while the gradual-engine-torque-increase control portion 104 is constituted by a portion of the control device 90 assigned to implement steps S6, S10, X10 and X11 of the control routine. Further, the engine-racing detecting portion 108 is constituted by a portion of the control device 90 assigned to implement step S8 of the control routine, and the engine-torque holding portion 110 is constituted by step S9 of the control routine, while the engine-torque-increase limiting portion 106 is constituted by a portion of the control device 90 assigned to implement steps Y1, Y2 and Y7 of the control routine. The engine torque control routine of FIGS. 8–10 is repeatedly executed with a predetermined cycle time.

Figure 8:
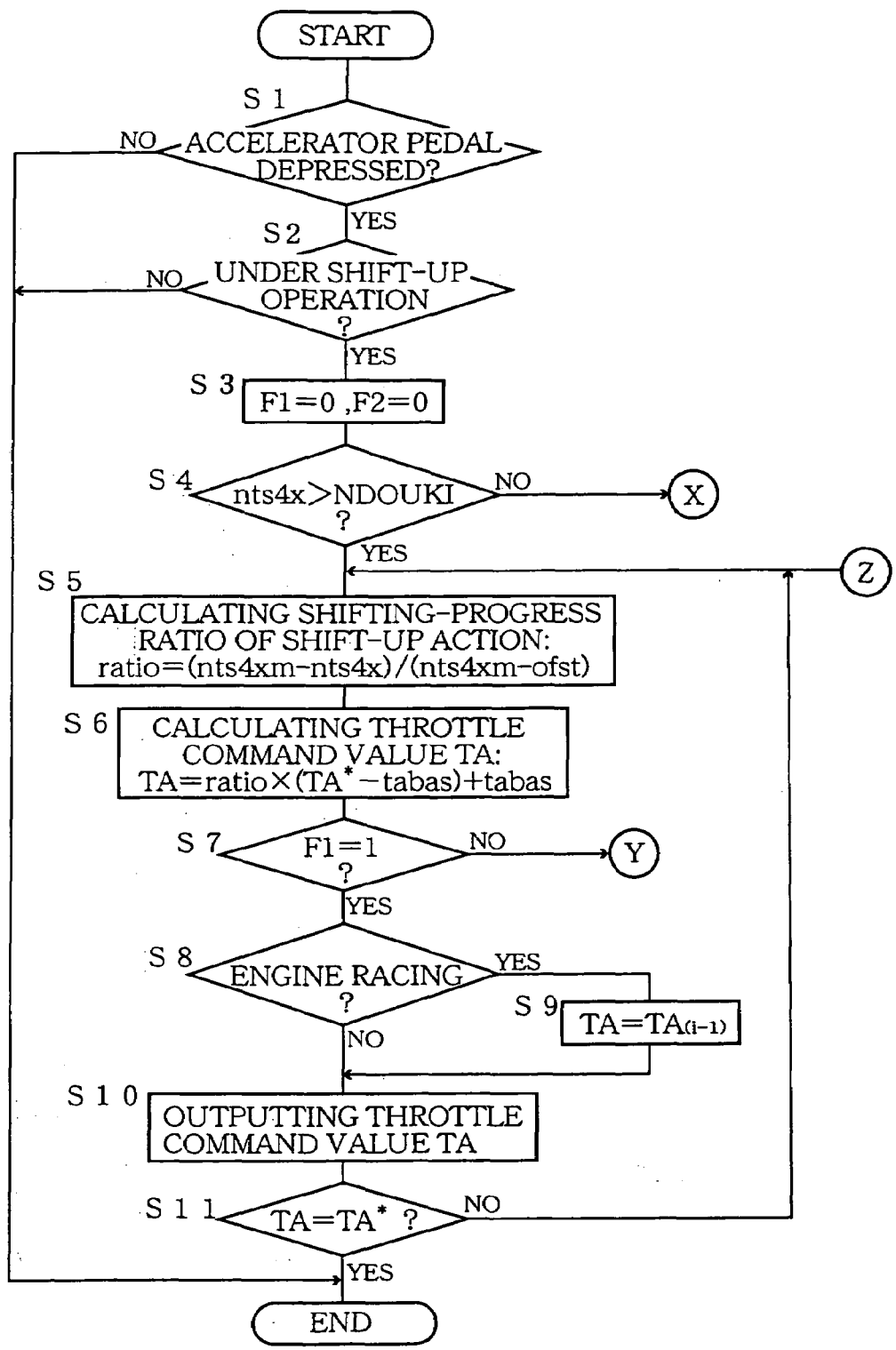
FIGS. 8, 9 and 10 are flow charts illustrating an engine torque control routine to control the engine torque.
Figure 11:
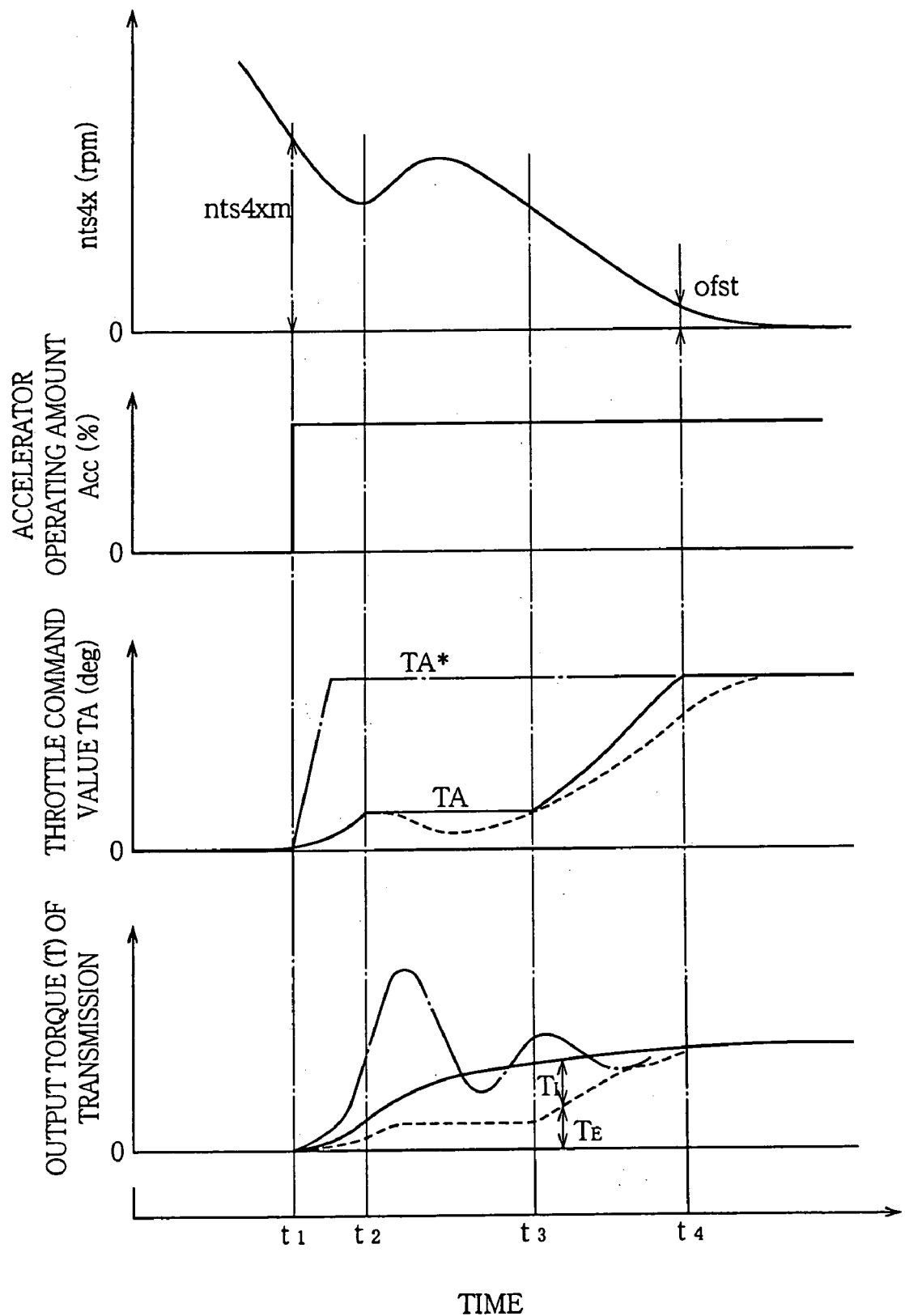
FIG. 11 is a time chart indicating changes of operating states of various portions of the vehicle when the engine torque control routine of FIGS. 8–10 is executed when the engine-output command is generated while a speed difference nts4x is larger than a threshold value NDOUK1.
Figure 12:
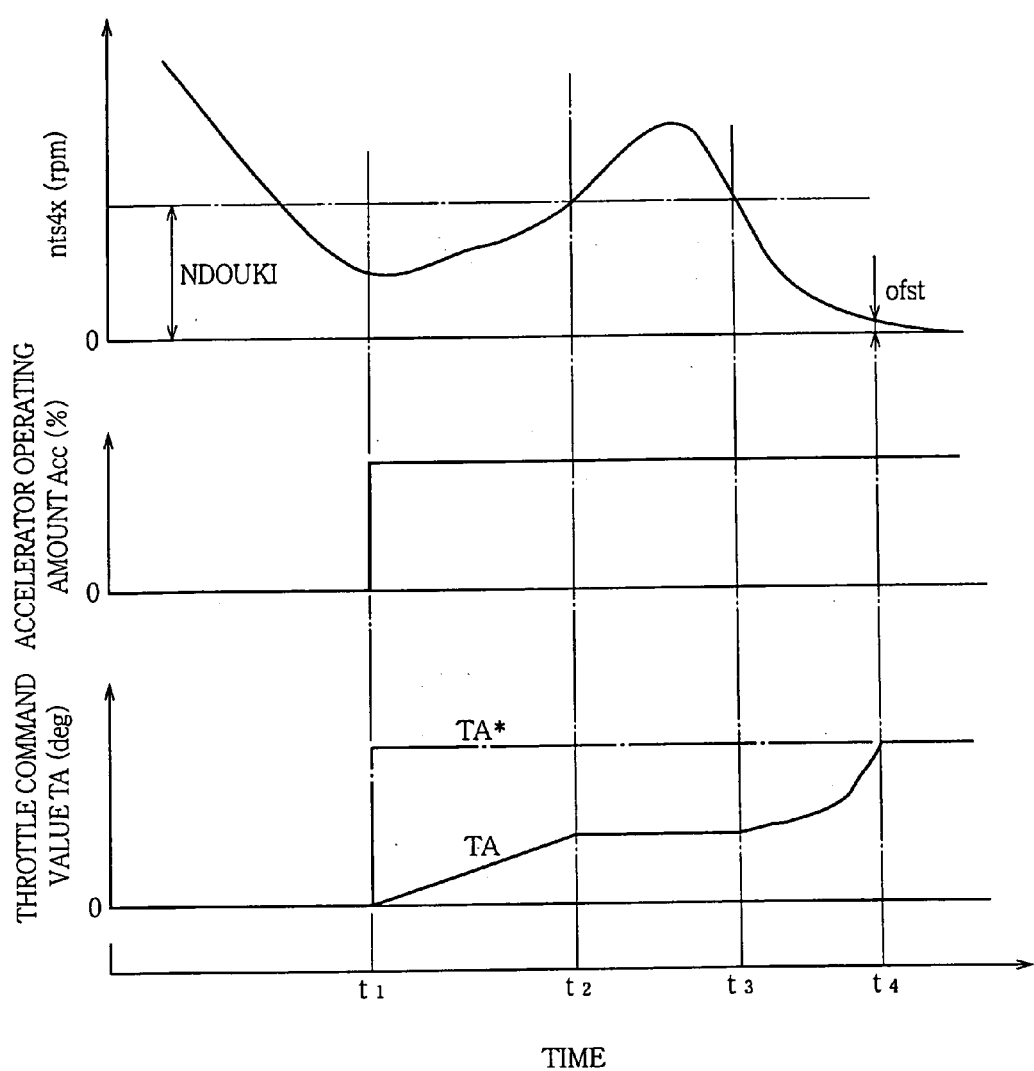
FIG. 12 is a time chart indicating changes of the operating sates of the various portions of the vehicle when the engine torque control routine of FIGS. 8–10 is executed while the speed difference nts4x is equal to or smaller than the threshold value NDOUK1.

The engine torque control routine is initiated with step S1 of FIG. 8 to determine whether an engine-output command requiring the engine 10 to provide an output as desired by the vehicle operator has been generated, more precisely, whether the accelerator pedal 50 has been depressed from the non-operated position to an operated position. This determination is made depending upon whether the engine-idling switch of the throttle sensor 64 is in the ON state or OFF state, or on the basis of the operating amount Acc of the accelerator pedal 50 detected by the acceleration sensor 51. If an affirmative decision (YES) is obtained in step S1, the control flow goes to step S2 to determine whether the automatic transmission 14 is under a shift-up operation action the $2^{nd}$-speed position to the $3^{rd}$-speed position, from the $3^{rd}$-speed position to the $4^{th}$-speed position, or from the $4^{th}$-speed position to the $5^{th}$-speed position. This determination is made on the basis of control flags used by the transmission-shifting control portion 120 to command the automatic transmission 14 to effect any one of those shift-up actions. If an affirmative decision (YES) is obtained in step S2, the control flow goes to step S3 and the subsequent steps to control the output torque of the engine 10. In the time charts of FIGS. 11 and 12, the engine torque control is initiated at a point of time t1 upon depression of the accelerator pedal 50 during a shift-up action of the automatic transmission 14 initiated while the accelerator pedal 50 was placed in the non-operated position, that is, in the absence of the engine-output control command. The time chart of FIG. 11 shows operating states of various portions of the vehicle where the step S4 and the subsequent steps are implemented for the engine torque control, and the time chart of FIG. 12 shows the operating states where the step X1 and the subsequent steps are implemented for the engine torque control.

Figure 13:
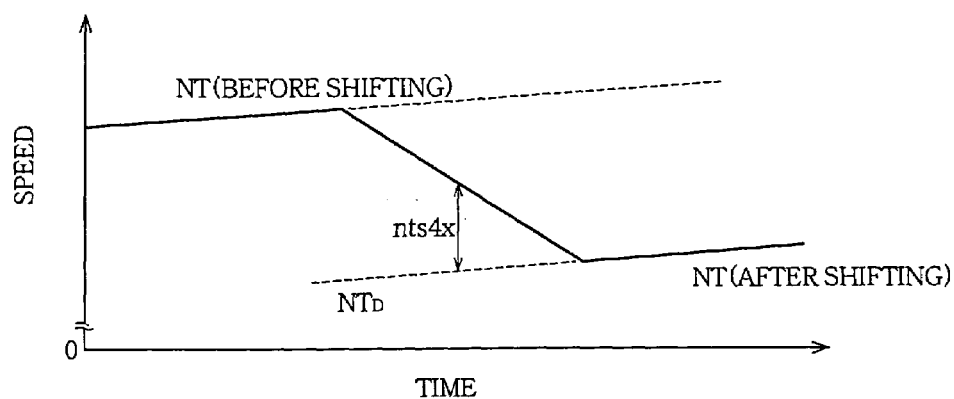
FIG. 13 is a view for explaining the speed difference nts4x.

Step S3 is implemented to reset a NORMAL-CONTROL INITIATION flag F1 and a NEAR-SYNC CONTROL flag F2 to "0". Step S3 is followed by step S4 to determine whether a speed difference nts4x is higher than a predetermined threshold NDOUKI. The speed difference nts4x is a difference $(NT-NT_D)$ between the speed NT of the turbine impeller 24 (hereinafter abbreviated as "turbine speed NE") which is equal to the speed $N_{IN}$ of the input shaft 22 before initiation of the shift-up action of the automatic transmission 14, and a synchronizing speed $NT_D$ of the input shaft 22 after completion of the shift-up action, as indicated in the graph of FIG. 13. The threshold value NDOUKI is a lower limit of the speed difference nts4x above which the vehicle does not suffer from a racing phenomenon of the engine 10 (an excessive rise of the engine speed NE) or an excessively large shifting shock of the automatic transmission 14 which arises from large amounts of change of a shifting-progress ratio and the engine torque $T_E$ due to an error of detection of the turbine speed sensor 76, with a small value of the denominator of the previously indicated equation (2), where the engine torque control is effected according to the shifting-progress ratio obtained according to the equation (2). In other words, the engine torque $T_E$ can be suitably controlled according to the shifting-progress ratio, as long as the speed difference nts4x is higher than the threshold value NDOUKI. The shifting-progress ratio represents a degree of progress of the shift-up action of the automatic transmission 14.

If the speed difference nts4x is higher than the threshold value NDOUKI, that is, if an affirmative decision (YES) is obtained in step S4, the control flow goes to determine the present value of the speed difference nts4x as a reference or initial value nts4xm, and calculate the shifting-progress ratio according to the above-indicated equation (2) which includes the calculated initial value nts4xm, the present value nts4x (equal to the value nts4xm in the first cycle of control), and a predetermined offset value "ofst". The denominator (nts4xm−ofst) of the equation (2) is a speed difference between the turbine speed NT upon initiation of the engine torque control, and a control terminating speed $(NT_D+ofst)$ which is higher by the offset value "ofst" than the synchronizing speed $NT_D$. When the turbine speed NT has been lowered to the control terminating speed $(NT_D+ofst)$, the shifting-progress ratio is increased to 1.0 (100% progress of the shift-up action). The offset value "ofst" is determined with an expected amount of control delay of the engine torque $T_E$, so that the engine torque $T_E$ coincides with a desired value as represented by the operating amount Acc of the accelerator pedal 50, upon completion of the shift-up action of the automatic transmission 14 with the turbine speed NT being lowered to the synchronizing speed $NT_D$ as a result of control of the throttle valve 56 according to the target throttle command value TA* corresponding to the operating amount Acc. The control delay of the engine torque $T_E$ varies with the engine speed NE, namely, increases with a decrease in the engine speed NE. In view of this fact, the offset value "ofst" is determined such that the offset value "ofst" increases with a decrease in the engine speed NE, so that the control terminating speed ($NT_D$+ofst) increases as the engine speed NE is lowered.

Step S5 is followed by step S6 to calculate the throttle command value TA according to the previously indicated equation (3), which includes the calculated shifting-progress ratio, the target throttle command value TA* (represented by the presently detected operating amount Acc of the accelerator pedal 50), and a value "tabas" which is the throttle command value TA at a moment of initiation of control of the throttle command value TA (that is, at a moment when the engine-output command was generated or when the step S6 is implemented for the first time after the depression of the accelerator pedal 50). When the engine torque control according to the shifting-progress ratio is initiated, the value "tabas" is almost zero or close to zero (with the engine 10 placed in its idling state). As the shifting-progress ratio increases, the throttle command value TA and the corresponding opening angle $\theta_{TH}$ of the throttle valve 56 gradually increases toward the target throttle command value TA* represented by the actually detected operating amount Acc of the accelerator pedal 50. During a period between points of time t1 and t2 and a period between points of time t3 and t4 in the time chart of FIG. 11, the throttle valve 56 is controlled according to the throttle command value TA calculated according to the above-indicated equation (3). At a point of time t4, the turbine speed NT has been lowered to the control terminating speed ($NT_D$+ofst), so that the shifting-progress ratio has been increased to 1.0 (indicating the 100% progress of the shift-up action), and the throttle command value TA has been increased to the target value TA*, as indicated by solid lines in the time chart of FIG. 11. According to this engine torque control, the engine torque $T_E$ can be controlled to a desired value corresponding to the present operating amount Acc of the accelerator pedal 50, upon completion of the shift-up action of the automatic transmission 14 with the turbine speed NT lowered to the synchronizing speed $NT_D$. If the shifting-progress ratio were calculated according to the above-indicated equation (1) which does not include the offset value "ofst", the throttle command value TA would be increased to the target value TA* corresponding to the operating amount Acc upon completion of the shift-up action of the automatic transmission 14, that is, the throttle command value TA would not be increased to the target value TA* when the turbine speed NT has been lowered to the control terminating speed ($NT_D$+ ofst), as indicated by broken line in FIG. 11, with a result of a control delay of the engine torque $T_E$, so that the engine torque $T_E$ can be increased to the desired value corresponding to the operating amount Acc only after an additional time has passed after the moment of completion of the shift-up action of the automatic transmission 14. It is noted that the operating amount Acc corresponds to an output torque value of the engine 10 as desired by the vehicle operator, and the throttle command value TA corresponds to the opening angle of the throttle value 56, while the target value TA* corresponds to a target opening angle of the throttle value 56, which corresponds to the operating amount Acc.

Step S6 is followed by step S7 to determine whether the NORMAL-CONTROL INITIATION flag F1 is set at "1". If an affirmative decision (YES) is obtained in step S7, the control flow goes to step S8 and the subsequent steps. If a negative decision (NO) is obtained in step S7, the control flow goes to step Y1 and the subsequent steps of FIG. 10. When step S7 of the engine torque control routine is implemented for the first time, the negative decision is obtained, and step Y1 and the subsequent steps will be implemented to limit the throttle command value TA to a value not larger than a predetermined upper limit (time× TASWMAX) so as to increase an output torque of the automatic transmission 14 for smooth acceleration of the vehicle while preventing a racing of the engine 10. Described in detail, step Y1 is implemented to determine whether the throttle command value TA calculated in step S6 is larger than the upper limit (time×TASWMAX), which is a predetermined upper limit TASWMAX of a rate of increase of the throttle command value TA multiplied by a time which has passed after the moment of initiation of control of the throttle command value TA (at the time step S6 was implemented for the first time). If an affirmative decision (YES) is obtained in step Y1, the control flow goes to step Y2 to limit the throttle command value TA to the upper limit (time×TASWMAX). The upper limit TASWMAX of the rate of increase of the throttle command value TA is determined so as to gradually increase the output torque of the automatic transmission 14 to give the vehicle operator a suitable feeling of acceleration of the vehicle while preventing the racing phenomenon of the engine 10, for a period of time immediately after the depression of the accelerator pedal 50 (after the generation of the engine-output command) during the shift-up action of the automatic transmission 14, that is, immediately after the steps S5 and S6 are implemented for the first time. During this period of time, the shifting-progress ratio calculated in step S5 and the throttle command value TA calculated in step S6 would be rapidly increased with a result of an abrupt increase of the engine torque $T_E$, resulting in an unstable control of the engine 10 with a risk of its racing phenomenon, in the progress of the shift-up action of the automatic transmission 14 in which the actual increase of the engine torque $T_E$ is delayed with respect to the throttle command value TA to increase the opening angle $\theta_{TH}$ of the throttle valve 56, if the throttle command value TA were not limited to the upper limit (time×TASWMAX). The upper limit TASWMAX of the rate of increase of the throttle command value Ta may be changed depending upon a suitable parameter of the vehicle such as the operating amount Acc of the accelerator pedal.

Step Y2 is followed by step Y3 to determine whether the speed difference nts4x is zero, that is, whether the shift-up action of the automatic transmission 14 is completed with the turbine speed NT being lowered to the synchronizing speed $NT_D$. If an affirmative decision (YES) is obtained in step Y3, the control flow goes to step Y4 to set the throttle command value TA to the target value TA*, and to step Y5 to apply the determined throttle command value TA to the throttle actuator 54 for controlling the throttle valve 50. In this case, the control routine of FIGS. 8–10 terminates the control of the engine torque $T_E$ upon operation or depression of the accelerator pedal 50 during a shift-up action of the automatic transmission 14 initiated in the absence of the throttle control command TA is terminated. If a negative decision (NO) is obtained in step Y3, the control flow goes to step Y7 to apply the throttle command value TA as obtained in step Y2 to the throttle actuator 54 for controlling the throttle valve 50. Step Y7 is followed by step Y8 to determine whether the throttle command value TA is equal to the target value TA*. If an affirmative decision (YES) is obtained in step Y8, the engine torque control is terminated. If a negative decision (NO) is obtained in step Y8, the control flow goes back to step S5 of FIG. 8.

If a negative decision (NO) is obtained in step Y1, that is, when the throttle command value TA is not larger than the upper limit (time×TASWMAX), this indicates that there is no longer a risk of the unstable control of the engine 10 such as its racing. In this case, the control flow goes to step Y6 to set the CONTROL INITIATION flag F1 to "1", and to sep Y7 and the subsequent steps Y8 and S5–S11. To more securely prevent the racing or other unstable control of the engine 10 immediately after the depression of the accelerator pedal 50 during a shift-up action of the automatic transmission 14, it is desirable to keep the NORMAL-CONTROL INITIATION flag F1 at "0" for a suitable time after the moment of depression of the accelerator pedal 50, and set the flag F1 to "1" when the calculated throttle command value TA has become equal to or smaller than the upper limit (time×TASWMAX).

Returning to the flow chart of FIG. 8, step S8 is implemented following an affirmative decision (YES) in step S7, to determine whether the engine 10 suffers from a racing phenomenon. This determination is made by determining whether the speed difference nts4x in the present cycle of execution of the present control routine is larger than the speed difference nts4x$_{(i-1)}$ in the last cycle of execution. If a negative decision (NO) is obtained in step S8, that is, the speed difference nts4x is equal to or smaller than the speed difference nts4x$_{(i-1)}$, the control flow goes to step S10 in which the throttle actuator 54 is controlled to control the throttle valve 56 according to the throttle command value TA as calculated in step S6. Step S10 is followed by step S11 to determine whether the throttle command value is equal to the target value TA*. If an affirmative decision (YES) is obtained in step S11, the engine torque control routine is terminated. If a negative decision (NO) is obtained in step S11, steps S5–S8, S10 and S11 are repeatedly implemented until the affirmative decision (YES) is obtained in step S11. It is noted that the graph of FIG. 11 shows the control of the throttle valve 56 as a result of repeated implementation of steps S5–S11 according to the throttle command value TA as calculated in step S6, without limitation of the throttle command value TA to the upper limit (time×TASWMAX) in step Y2, namely, with the NORMAL-CONTROL-INITIATION flag F1 set to "1" following the negative decision (NO) obtained in step Y1 in the first cycle of execution of the control routine.

If an affirmative decision (YES) is obtained in step S8, that is, if the engine 10 suffers from a racing phenomenon with the speed difference nts4x being larger than the speed difference nts4x$_{(i-1)}$, the control flow goes to step S9 to store the speed difference nts4x$_{(i-1)}$ in the last control cycle as an engine-racing speed difference nts4xFUKI, and set the throttle command value TA$_{(i-1)}$ in the last control cycle as the value TA in the present control cycle, so that the opening angle θ$_{TH}$ of the throttle valve 56 and the engine torque T$_E$ are kept unchanged in step S10. When the step S8 is subsequently implemented, the present speed difference nts4x is compared with the stored engine-racing speed difference nts4xFUKI to determine in step S8 whether the engine 10 suffers from the racing phenomenon. As long as the speed difference nts4x is larger than nts4xFUKI, steps S9 and S10 are repeatedly implemented so that the throttle command value TA and the opening angle θ$_{TH}$ of the throttle valve 56 are kept unchanged. When the speed difference nts4x has become equal to or smaller than nts4xFUKI, this indicates the absence of the engine racing. In this case, the negative decision (NO) is obtained in step S8, and the throttle actuator 54 is controlled in step S10 according to the throttle command value TA as calculated in step S6, so that the engine torque T$_E$ is gradually increased.

In the example of FIG. 11, the engine racing is detected during a time period between points of time t2 and t3, so that the throttle command value TA applied to the throttle actuator 54 is kept constant during this time period, as indicated by solid line, although the throttle command value TA as calculated in step S6 changes as indicated by broken line, that is, even when the calculated throttle command value TA is reduced as a result of an increase of the speed difference nts4x and a consequent decrease of the shifting-progress ratio due to the racing of the engine 10. If the opening angle θ$_{TH}$ of the throttle valve 56 were controlled according to the throttle command value TA as calculated in step S6, the opening angle θ$_{TH}$, the engine torque T$_E$ and the output torque of the automatic transmission 14 suffer from a hunting phenomenon (unstable decrease and increase), so that the automatic transmission 14 suffers from a shifting shock and a relatively long time required to complete the shift-up action. Further, it takes a longer time for the throttle command value TA to be increased to the target value TA*. In view of this drawback, the throttle command value TA applied to the throttle actuator 54 is not reduced but is kept constant during the racing of the engine 10.

By controlling the throttle command value TA applied to the throttle actuator 54 as indicated by solid line in FIG. 11 according to the principle of this invention, the output torque T of the automatic transmission 14 is controlled as indicated by solid line. The output torque T, which consists of the engine torque T$_E$ indicated by broken line, and an inertia torque T$_I$ indicated as a distance between the solid line and the broken line, is smoothly or gradually increased for smooth acceleration of the vehicle, with the engine torque T$_E$ being gradually increased during the time period between t1 and t2 and the time period between t3 and t4 and kept constant during the time period between t2 and t3. One-dot chain lines in FIG. 11 indicate the conventional control of the throttle valve 56 (throttle actuator 54) according to the target throttle command value TA* determined by the operating amount Acc of the accelerator pedal 50. According to the conventional control, the automatic transmission 14 suffers from an abrupt increase or hunting phenomenon of its output torque T and a consequent shifting shock, due to abrupt increases of the engine torque T$_E$ and inertia torque T$_I$, and due to an excessive rise of the engaging hydraulic pressure of the frictional coupling device to be engaged to effect the shift-up action.

If a negative decision (NO) is obtained in step S4, that is, if the speed difference nts4x is not larger than the threshold value NDOUKI, this indicates that the output torque of the engine 10 cannot be suitably controlled on the basis of the shifting-progress ratio. In this case, the control flow goes to step X1 and the subsequent steps of FIG. 9. In step X1, the throttle command value TA is calculated as in step Y2 described above, according to the previously indicated equation (4), which includes the upper limit TASWMAX of the rate of increase of the throttle command value TA, so that the output torque of the automatic transmission 14 is gradually increased for smooth acceleration of the vehicle while preventing the racing phenomenon of the engine 10. Step X1 is followed by step X2 to determine whether the speed difference nts4x has become larger than the threshold value NDOUKI as a result of an increase of the turbine speed NT.

When step X2 is implemented for the first time, a negative decision (NO) is obtained, and the control flow goes to step X6 and the subsequent steps.

Step X6 is implemented to determine whether the speed difference is zero, that is, whether the shift-up action of the automatic transmission 14 is completed with the turbine speed NT being lowered to the synchronizing speed $NT_D$. If an affirmative decision (YES) is obtained in step X6, the control flow goes to step X13 to set the throttle command value TA to the target value TA*, and to step X14 to control the throttle actuator 54 according to the throttle command value TA. In this case, the engine torque control routine upon depression of the accelerator pedal 50 during the shift-up action of the automatic transmission 14 is terminated. If a negative decision (NO) is obtained in step X6, the control flow goes to step S7 to determine whether the present throttle control value TA is equal to the target value TA*. If an affirmative decision (YES) is obtained in step X6, step X14 is implemented, and the engine torque control routine is terminated. If a negative decision (NO) is obtained in step X6, the control flow goes to step X8 to determine whether the NEAR-SYNC flag F2 is set at "1". When the step X8 is implemented for the first time, a negative decision (NO) is obtained in this step X8, and the control flow goes to step X12 in which the throttle actuator 54 is controlled according to the throttle command value TA calculated in step X1, and steps X1, X2, X6–X8 and X12 are repeatedly implemented until an affirmative decision (YES) is obtained in step X8, so that the throttle command value TA is gradually increased at the predetermined rate TASWMAX, and the opening angle $\theta_{TH}$ of the throttle valve 56 and the engine torque $T_E$ are accordingly increased. In the example of FIG. 11, the throttle command value TA and the opening angle $\theta_{TH}$ of the throttle valve 56 are gradually increased at the predetermined rate TASWMAX, with a result of a gradual increase of the engine torque $T_E$, during the time period between t1 and t2. In an example of FIG. 12, the speed difference nts4x exceeds the threshold value NDOUKI at the point of time t2 due to an increase of the turbine speed NT as a result of the gradual increase of the engine torque $T_E$. Under some condition, however, the gradual increase of the engine torque $T_E$ causes a continuous decrease of the turbine speed NT, and permits the shift-up action of the automatic transmission 14 to be completed.

When the speed difference nsts4x has increased to the threshold value NDOUKI at the point of time t2, as in the example of FIG. 12, an affirmative decision (YES) is obtained in step X2, and the control flow goes to steps X3–X5. In step X3, the throttle command value $TA_{(i-1)}$ in the last control cycle is determined as the throttle command value in the present control cycle, as in step S9. In the following step X4, the NEAR-SYNC flag F2 is set to "1". In the following step X5, the throttle actuator 54 is controlled according to the throttle command value TA determined in step X3. Steps X2–X5 are repeatedly implemented until the speed difference nts4x has decreased to the threshold value NDOUKI. Thus, the opening angle $\theta_{TH}$ of the throttle valve 56 and the engine torque $T_E$ are kept constant. In the example of FIG. 12, steps X2–X5 are repeatedly implemented during the time period between t2 and t3, and the throttle command value TA (opening angle $\theta_{TH}$) is kept constant during this time period.

At the point of time t3 at which the speed difference nts4x has decreased down to the threshold value NDOUKI, the negative decision (NO) is obtained in step X2, and step X6 and the subsequent steps are implemented. In this instance, an affirmative decision (YES) is obtained in step X8, since the NEAR-SYNC flag F2 is now set at "1". Accordingly, steps X9–X11 are subsequently implemented repeatedly via steps X2 and X6–X8, until the affirmative decision (YES) is obtained in step X7. Accordingly, the engine torque $T_E$ is gradually increased according to the shifting-progress ratio, as in steps X5, S6 and X10. In step X9, however, the threshold value NDOUKI is used in place of the initial value nsts4m used in step S5. Namely, the shifting-progress ratio is calculated in step X9 according to the previously indicated equation (6), and the throttle command value TA is calculated in step X10 on the basis of the calculated degree "ratio" and according to the above-indicated equation (3). The value "tabas" is the throttle command value TA at the point of time t3 at which the speed difference nsts4x has decreased to the threshold value NDOUKI. In the example of FIG. 12, the throttle actuator 54 is controlled by repeated implementation of the steps X9–X11 during the time period between t3 and t4, according to the throttle command value TA calculated according to the equation (3) which includes the shifting-progress ratio calculated according to the equation (6). At the point of time t4, the turbine speed NT has been lowered to the control terminating speed ($NT_D$+ofst), and the shifting-progress ratio has been increased to 1.0 (100%), so that the throttle command value TA is made equal to the target value TA* corresponding to the operating amount Acc of the accelerator pedal 50.

According to the vehicle control apparatus in the form of the engine control portion 100, the shifting-progress ratio is obtained in steps X5 and X9 according to the equation (2) or (6) and on the basis of a change of the turbine speed NT, more precisely, on the basis of the speed difference nts4x between the turbine speed NT and the synchronizing speed $NT_D$ of the input shaft 22 after completion of the shift-up action of the automatic transmission 14. Further, the throttle command value TA is determined according to the equation (3) and on the basis of the obtained shifting-progress ratio, in steps X6, X10, X10 and X11, so that the engine torque $T_E$ is gradually increased as the shift-up action progresses. Accordingly, the output torque of the automatic transmission 14 can be controlled with a high degree of response to the desired engine output (engine-output command) in the form of the operating amount Acc of the accelerator pedal (represented by the output signal of the accelerator sensor 51), while the increase of the engine torque $T_E$ is suitably restricted, so as to minimize the shifting shock of the automatic transmission 14 due to an excessive increase of the output torque.

The shifting-progress ratio corresponds to the amount of reduction of the turbine speed NT, namely, the torque capacity of the frictional coupling device to be engaged to effect the shift-up action of the automatic transmission 14. On the basis of this torque capacity of the frictional coupling device, the engine control portion 100 is arranged to control the throttle command value TA to gradually increase the engine torque $T_E$, making it possible to minimize the amount of slipping and thermal load of the frictional coupling device and the racing phenomenon of the engine 10, and to improve the durability of the frictional coupling device.

Where the accelerator pedal 50 is depressed during the shift-up action of the transmission 14 while the speed difference nts4x is not larger than the threshold value NDOUKI, the gradual increase of the engine torque $T_E$ according to the shifting-progress ratio is restricted so as to prevent a racing of the engine 10 and an excessive shifting shock of the transmission 14 due to an increase of the engine torque $T_E$, which may arise from an abrupt variation of the shifting-progress ratio due to an error of detection of the turbine speed sensor 76, for example. Where the speed difference nts4x upon depression of the accelerator pedal 50, that is, where the initial value nts4xm of the speed difference nts4x is smaller than the threshold value NDOUKI, the denominator (nts4xm−ofst) of the equation (2) indicated above is accordingly small, a slight change of the speed difference nts4x due to an error of detection of the turbine speed NT will cause a relatively large amount of change of the shifting-progress ratio as calculated according to the equation (2), which in turn causes a large amount of change of the engine torque $T_E$.

Where the speed difference nts4x is equal to or smaller than the threshold value NDOUKI, the engine torque $T_E$ is gradually increased at the predetermined rate TASWMAX in steps X1 and X12. Thus, the engine control portion 100 permits the automatic transmission 14 to provide a larger output torque, and a higher degree of acceleration of the vehicle while preventing the racing of the engine 10, than an apparatus arranged to inhibit an increase of the engine torque $T_E$ or hold the engine torque $T_E$ constant at the value of the engine idling state until the shift-up action of the automatic transmission 14 is completed.

Where the racing of the engine 10 is detected in step S8, the throttle command value TA is kept constant in step S9 to hold the engine torque $T_E$ constant, for thereby preventing a hunting phenomenon of the engine torque $T_E$ and the output torque of the automatic transmission 14. Namely, the racing of the engine 10 indicates an increase of the engine speed NE that should be lowered in the process of the shift-up action of the automatic transmission 14, and results in a decrease of the shifting-progress ratio. If the engine torque control is continued in steps S5 and S6 according to the shifting-progress ratio while the engine 10 is in a racing state, the engine torque $T_E$ is once reduced according to the decrease of the shifting-progress ratio. In the meantime, the engaging hydraulic pressure of the frictional coupling device to be engaged to effect the shift-up action of the automatic transmission 14 is raised in the predetermined pressure control pattern as indicated in FIG. 14, so that the shifting-progress ratio is rapidly increased during the reduction of the engine torque $T_E$, so that the engine torque $T_E$ is subsequently increased. Thus, the engine racing causes the hunting of the output torque of the transmission 14 with the engine torque.

In the present embodiment wherein the engine torque $T_E$ is gradually increased by electrically controlling the throttle actuator 54 to increase the opening angle $\theta_{TH}$ of the throttle valve 56, an increase of the engine torque $T_E$ is inevitably delayed with respect to an increase of the opening angle $\theta_{TH}$. Immediately after the depression of the accelerator pedal 50 (after the generation of the engine-output command) during the shift-up action), however, the throttle command value TA is limited to the upper limit (time×TASWMAX) in step Y2 of FIG. 10 so that the throttle command value TA is gradually increased at the predetermined rate TASWMAX to limit the rate of increase of the engine torque $T_E$, that is, to prevent an excessive increase of the engine torque $T_E$ due to the above-indicated control delay in the progress of the shift-up action of the automatic transmission 14. The gradual increase of the engine torque $T_E$ at the predetermined rate TASWMAX permits an increase of the output torque of the automatic transmission 14 for suitably accelerating the vehicle while preventing the racing of the engine 10.

The equations (2) and (6) used to calculate the shifting-progress ratio are formulated such that the "ratio" is equal to 1.0 when the turbine speed NT has been lowered to the control terminating speed which is higher than the synchronizing speed ($NT_D$+ofst). Further, the equation (3) used to calculate the throttle command value TA is formulated such that the throttle command value TA coincides with the target value TA* corresponding to the operating amount Acc of the accelerator pedal 50 when the "ratio" is 1.0. Accordingly, the engine torque $T_E$ can be controlled to the value corresponding to the operating amount Acc of the accelerator pedal 50 upon completion of the shift-up action of the transmission 14 with the turbine speed. NT being lowered to the synchronizing speed $NT_D$, even in the presence of the control delay of the engine torque $T_E$. In other words, the offset value "ofst", that is, the control terminating speed ($NT_D$+ofst) is determined by taking account of the control delay of the engine torque $T_E$, so that the engine torque $T_E$ is eventually controlled to a value corresponding to the target throttle command value TA* determined by the operating amount Acc of the accelerator pedal 50, when the shift-up action of the transmission 14 is completed with the turbine speed NT being lowered to the synchronizing speed $NT_D$. Accordingly, the engine torque $T_E$ and the output torque of the transmission 14 upon completion of the shift-up action can be controlled to the values corresponding to the operating amount Acc of the accelerator pedal 50, even in the presence of the preceding control delay of the engine torque $T_E$.

The control delay of the engine torque $T_E$ varies with the engine speed NE, that is, increases with a decrease of the engine speed NE. In the present embodiment, however, the offset value "ofst" is changed on the basis of the engine speed NE, so that the engine torque TE upon completion of the shift-up action is held constant at the value corresponding to the target throttle command value TA*, irrespectively of the engine speed NE.

It is to be understood that the present invention may be embodied with various other changes, modifications and improvements, which may occur to those skilled in the art, without departing from the spirit and scope of the invention defined in the following claims:

What is claimed is:

1. An apparatus for controlling an automotive vehicle including an engine, and an automatic transmission including a plurality of frictional coupling devices and having a plurality of operating positions having respective different speed ratios, which are selectively established by selective engaging and releasing actions of said plurality of frictional coupling devices, to transmit a rotary motion of the engine to drive wheels of the vehicle, said apparatus being operable upon generation of an engine-output control command requiring an output of the engine during a shift-up action of the automatic transmission by the engaging action of a selected one of the frictional coupling devices initiated in the absence of the engine-output control command, said apparatus comprising:

an engine-output control command determining portion which determines if there is an absence of an engine-output control command after a shift-up action has been initiated, and which determines whether an engine-output control command has thereafter been generated during the shift-up action;

a shifting-progress calculating portion operable to calculate a degree of progress of said shift-up action of said automatic transmission after a moment of generation of said engine-output control command, on the basis of a change of a rotating speed of a rotary element which changes with the progress of said shift-up action; and a gradual-engine-torque-increase control portion operable to control said engine on the basis of said degree of progress of said shift-up action calculated by said shifting-progress calculating portion, so as to gradually increase an output torque of the engine with the progress of said shift-up action.

2. An apparatus according to claim 1, wherein said rotary element is an input shaft of said automatic transmission, and said shifting-progress calculating portion is operable to calculate said degree of progress of said shift-up action of the automatic transmission, on the basis of a speed difference between a rotating speed of said input shaft and a synchronizing speed of said input shaft after completion of said shift-up action.

3. An apparatus according to claim 1, wherein said engine has an electrically operated throttle valve, and said gradual-engine-torque-increase control portion is operable to electrically control said throttle valve so as to gradually increase an opening angle of said throttle valve for thereby gradually increase the output torque of the engine.

4. An apparatus according to claim 1, wherein said engine-output command represents an operating amount of a vehicle accelerating member manually operated by an operator of the vehicle.

5. An apparatus according to claim 1, wherein when said engine-output control command determining portion determines there is an absence of an engine-output control command after the shift-up action has been initiated and does not thereafter determine that an engine-output control command has been generated during the shift-up action, the gradual-engine torque-increase control portion is not used to gradually increase the output torque.

6. An apparatus for controlling an automotive vehicle including an engine, and an automatic transmission including a plurality of frictional coupling devices and having a plurality of operating positions having respective different speed ratios, which are selectively established by selective engaging and releasing actions of said plurality of frictional coupling devices, to transmit a rotary motion of the engine to drive wheels of the vehicle, said apparatus being operable upon generation of an engine-output control command reciuiring an output of the engine during a shift-up action of the automatic transmission by the engaging action of a selected one of the frictional coupling devices initiated in the absence of the engine-output control command, said apparatus comprising:
  a shifting-progress calculating portion operable to calculate a degree of progress of said shift-up action of said automatic transmission after a moment of generation of said engine-output control command, on the basis of a change of a rotating speed of a rotary element which changes with the progress of said shift-up action;
  a gradual-engine-torciue-increase control portion operable to control said engine on the basis of said degree of progress of said shift-up action calculated by said shifting-progress calculating portion, so as to gradually increase an output torciue of the engine with the progress of said shift-up action; and
  a gradual-increase restricting portion operable upon generation of said engine-output control command when a speed difference between the rotating speed of said rotary element and a synchronizing speed of said rotary element after completion of said shift-up action is not larger than a predetermined threshold, said gradual-increase restricting portion restricting an operation of said gradual-engine-torque-increase control portion to control the engine on the basis of said degree of progress of said shift-up action.

7. An apparatus for controlling an automotive vehicle including an engine, and an automatic transmission including a plurality of frictional coupling devices and having a plurality of operating positions having respective different speed ratios, which are selectively established by selective engaging and releasing actions of said plurality of frictional coupling devices, to transmit a rotary motion of the engine to drive wheels of the vehicle, said apparatus being operable upon generation of an engine-output control command requiring an output of the engine during a shift-up action of the automatic transmission by the engaging action of a selected one of the frictional coupling devices initiated in the absence of the engine-output control command, said apparatus comprising:
  a shifting-progress calculating portion operable to calculate a degree of progress of said shift-up action of said automatic transmission after a moment of generation of said engine-output control command, on the basis of a change of a rotating speed of a rotary element which changes with the progress of said shift-up action;
  a gradual-engine-torciue-increase control portion operable to control said engine on the basis of said degree of progress of said shift-up action calculated by said shifting-progress calculating portion, so as to gradually increase an output torque of the engine with the progress of said shift-up action;
  an engine-racing detecting portion operable to detect a racing of said engine; and
  an engine-torque holding portion operable upon detection of the racing of the engine by said engine-racing detecting portion, to disable said gradual-engine-torque-increase control portion to operate, and hold the output torque of the engine constant.

8. An apparatus for controlling an automotive vehicle including an engine having an electrically operated throttle value, and an automatic transmission including a plurality of ftictional coupling devices and having a plurality of operating positions having respective different speed ratios, which are selectively established by selective engaging and releasing actions of said plurality of frictional coupling devices, to transmit a rotary motion of the engine to drive wheels of the vehicle, said apparatus being operable upon generation of an engine-output control command requiring an output of the engine during a shift-up action of the automatic transmission by the engaging action of a selected one of the frictional coupling devices initiated in the absence of the engine-output control command, said apparatus comprising:
  a shifting-progress calculating portion operable to calculate a degree of progress of said shift-up action of said automatic transmission after a moment of generation of said engine-output control command, on the basis of a change of a rotating speed of a rotary element which changes with the progress of said shift-up action;
  a gradual-engine-torciue-increase control portion operable to electrically control said throttle valve so as to gradually increase an opening angle of said throttle valve on the basis of said degree of progress of said shift-up action calculated by said shifting-progress calculating portion, so as to gradually increase an output torclue of the engine with the progress of said shift-up action; and
  an engine-torque-increase limiting portion operable immediately after the generation of said engine-output control command during said shift-up action of said automatic transmission, to limit an increase of the opening angle of said throttle valve by said gradual-engine-torque control portion, to a predetermined upper limit.

9. An apparatus for controlling an automotive vehicle including an engine having an electrically operated throttle value, and an automatic transmission including a plurality of frictional coupling devices and having a plurality of operating positions having respective different speed ratios, which are selectively established by selective engaging and releasing actions of said plurality of frictional coupling devices, to transmit a rotary motion of the engine to drive wheels of the vehicle, said apparatus being operable upon generation of an engine-output control command requiring an output of the engine during a shift-up action of the automatic transmission by the engaging action of a selected one of the frictional coupling devices initiated in the absence of the engine-output control command, said apparatus comprising:

a shifting-progress calculating portion operable to calculate a degree of progress of said shift-up action of said automatic transmission after a moment of generation of said engine-output control command, on the basis of a change of a rotating speed of a rotary element which changes with the progress of said shift-up action;

a gradual-engine-torque-increase control portion operable to electrically control said throttle valve so as to gradually increase an opening angle of said throttle valve on the basis of said degree of progress of said shift-up action calculated by said shifting-progress calculating portion, so as to gradually increase an output torque of the engine with the progress of said shift-up action, wherein said shifting-progress calculating portion is operable to calculate, as said degree of progress, a ratio of progress of said shift-up action of said automatic transmission such that the calculated ratio of progress is increased to 1.0 when the rotating speed of said rotary element has been lowered to a control terminating speed which is higher by a predetermined amount than a synchronizing speed of said rotary element after completion of said shift-up action, and said gradual-engine-torque-increase control portion is operable to control the opening angle of said throttle valve on the basis of the calculated ratio of progress such that the opening angle coincides with a target value corresponding to a value of said engine-output control command, when said calculated ratio has been increased to 1.0.

10. An apparatus according to claim 9, wherein said control terminating speed is determined so as to change with an operating speed of said engine, depending upon a control delay of the output torque of the engine, such that the output torque of the engine corresponds to said target value of the opening angle of said throttle valve when said shift-up action of the automatic transmission is completed with the rotating speed of said rotary element being lowered to said synchronizing speed.

* * * * *